US012720635B2

(12) United States Patent
Back et al.

(10) Patent No.: US 12,720,635 B2
(45) Date of Patent: Aug. 25, 2026

(54) METHOD AND DEVICE FOR PROCESSING STATE TRANSITION IN WIRELESS COMMUNICATION SYSTEM

(71) Applicant: LG Electronics Inc., Seoul (KR)

(72) Inventors: Seoyoung Back, Seoul (KR); Giwon Park, Seoul (KR); Seungmin Lee, Seoul (KR); Jongwoo Hong, Seoul (KR)

(73) Assignee: LG Electronics Inc., Seoul (KR)

( * ) Notice: Subject to any disclaimer, the term of this patent is extended or adjusted under 35 U.S.C. 154(b) by 247 days.

(21) Appl. No.: 18/258,077

(22) PCT Filed: Jan. 5, 2022

(86) PCT No.: PCT/KR2022/000168
§ 371 (c)(1),
(2) Date: Jun. 16, 2023

(87) PCT Pub. No.: WO2022/149853
PCT Pub. Date: Jul. 14, 2022

(65) Prior Publication Data

US 2024/0073989 A1 Feb. 29, 2024

Related U.S. Application Data

(60) Provisional application No. 63/144,481, filed on Feb. 2, 2021, provisional application No. 63/143,006, filed
(Continued)

(30) Foreign Application Priority Data

Jan. 5, 2021 (KR) ........................ 10-2021-0000989
Jan. 5, 2021 (KR) ........................ 10-2021-0000991

(51) Int. Cl.
*H04W 76/27* (2018.01)
*H04W 76/14* (2018.01)
*H04W 88/04* (2009.01)

(52) U.S. Cl.
CPC .......... *H04W 76/27* (2018.02); *H04W 76/14* (2018.02); *H04W 88/04* (2013.01)

(58) Field of Classification Search
None
See application file for complete search history.

(56) References Cited

U.S. PATENT DOCUMENTS 11,012,972 B2 * 5/2021 Hong .................... H04W 76/28
11,063,657 B2 * 7/2021 Fujishiro ............ H04W 68/005
(Continued)

FOREIGN PATENT DOCUMENTS

EP 3606281 A1 2/2020
KR 10-2017-0118172 10/2017
(Continued)

OTHER PUBLICATIONS

Summary Report of Relay Proposals from summary of agenda item 8.7.4.1 R2-2104405 Apr. 2021 (Year: 2021).*
(Continued)

*Primary Examiner* — Joseph E Avellino
(74) *Attorney, Agent, or Firm* — Fish & Richardson P.C.

(57) ABSTRACT

The present disclosure relates to processing a state transition in a wireless communication system. According to an embodiment disclosed herein, a method performed by a first user equipment (UE) in a wireless communication system comprises the steps of: monitoring phasing for a second UE in a first state; acquiring state information indicating that the state of the second UE has changed from the first state to a second state; and stopping the monitoring of the phasing for the second UE in the second state on the basis of the
(Continued)

acquisition of the state information, wherein the first state includes at least one of an idle state or a nonactive state, and the second state includes a connected state.

7 Claims, 20 Drawing Sheets

Related U.S. Application Data on Jan. 28, 2021, provisional application No. 63/137,671, filed on Jan. 14, 2021.

(56) References Cited

U.S. PATENT DOCUMENTS 11,259,269 B2 * 2/2022 Chun .................... H04W 76/27
11,395,247 B2 * 7/2022 Shih .................... H04W 56/001
11,457,501 B2 * 9/2022 Xu ........................ H04W 76/19
11,490,448 B1 * 11/2022 Kuo ...................... H04W 76/27
12,120,633 B2 * 10/2024 Xu ........................ H04W 76/20
12,207,321 B2 * 1/2025 Freda .................... H04W 76/27
12,273,855 B2 * 4/2025 Xu ........................ H04W 76/10
2018/0077624 A1 3/2018 Jung et al.
2018/0167946 A1 * 6/2018 Si .............................. H04L 5/00
2020/0091991 A1 3/2020 Fujishiro et al.
2020/0100308 A1 3/2020 Lee et al.
2022/0132464 A1 * 4/2022 Agiwal ............... H04W 72/044
2022/0303942 A1 * 9/2022 Xu ........................ H04W 76/10
2023/0180178 A1 * 6/2023 Yang ..................... H04W 76/14 455/458
2023/0224858 A1 * 7/2023 Cheng ................... H04W 68/02 455/458
2023/0224859 A1 * 7/2023 Cheng ................... H04W 68/02 455/458
2023/0308840 A1 * 9/2023 Shi ........................ H04L 12/185
2023/0328689 A1 * 10/2023 Ozturk .................. H04W 76/14 455/458
2023/0397100 A1 * 12/2023 Chen ..................... H04W 72/25
2024/0205993 A1 * 6/2024 Chang ................... H04W 48/20

FOREIGN PATENT DOCUMENTS

KR 10-2019-0033846 4/2019
KR 10-2019-0140947 12/2019
WO WO-2017099837 A1 * 6/2017 ............ H04W 68/00
WO WO-2017196611 A1 * 11/2017 ............ H04W 88/04
WO WO-2021034074 A1 * 2/2021 ............ H04W 76/27
WO WO-2021092480 A1 * 5/2021 ............ H04W 88/04

OTHER PUBLICATIONS

Paging Procedures for L2 UE to NW Relays; Interdigital; Agenda Item 8.7.2.1; Aug. 2021 (Year: 2021).*
Extended European Search Report in European Appln. No. 22736830.5, mailed on May 8, 2024, 10 pages.
International Search Report and Written Opinion in International Appln. No. PCT/KR2022/000168, mailed on Apr. 14, 2022, 13 pages (with English translation).
Sony, "Paging via Relay," R2-1701494, 3GPP TSG RAN WG2, Meeting #97, Athens, Greece, Feb. 13-17, 2017, 4 pages.
Xiaomi et al., "Issue on ping pong state transition for sidelink UE," R2-2010463, 3GPP TSG-RAN WG2, Meeting #112e, Electronic meeting, Nov. 2-13, 2020, 4 pages.
ZTE, "Further consideration on the paging of remote UE," R2-1704638, 3GPP TSG RAN WG2, Meeting #98, Hangzhou, China, May 15-19, 2017, 4 pages.
Office Action in Chinese Appln. No. 202280009135.7, mailed on Mar. 20, 2026, 11 pages (with English translation).

* cited by examiner

FIG. 3

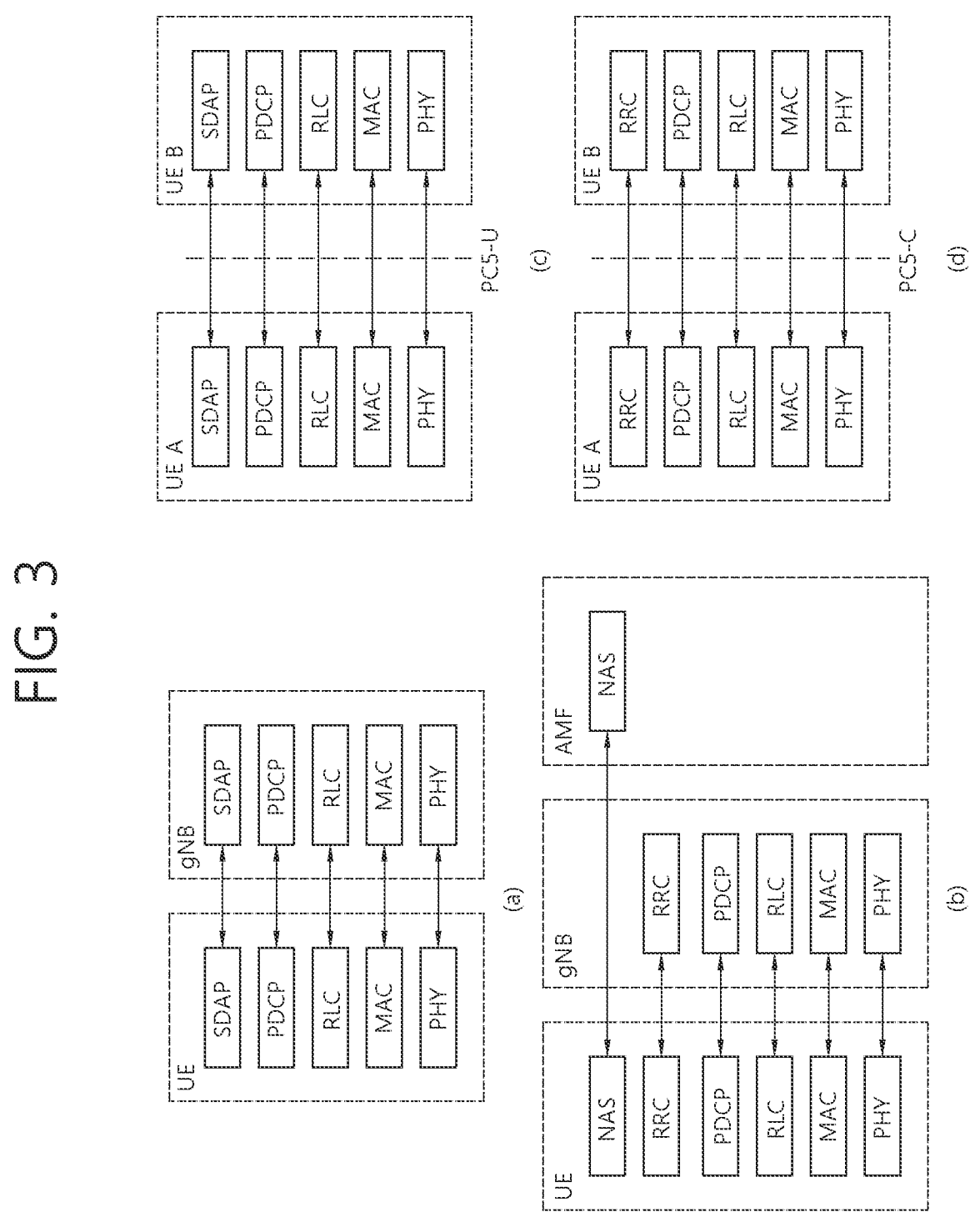

UE
SDAP
PDCP
RLC
MAC
PHY gNB
SDAP
PDCP
RLC
MAC
PHY (a)

UE
NAS
RRC
PDCP
RLC
MAC
PHY gNB
RRC
PDCP
RLC
MAC
PHY

AMF
NAS (b)

UE A
SDAP
PDCP
RLC
MAC
PHY

PC5-U

UE B
SDAP
PDCP
RLC
MAC
PHY (c)

UE A
RRC
PDCP
RLC
MAC
PHY

PC5-C

UE B
RRC
PDCP
RLC
MAC
PHY (d)

METHOD AND DEVICE FOR PROCESSING STATE TRANSITION IN WIRELESS COMMUNICATION SYSTEM

CROSS-REFERENCE TO RELATED APPLICATIONS

This application is a National Stage application under 35 U.S.C. § 371 of International Application No. PCT/KR2022/000168, filed on Jan. 5, 2022, which claims the benefit of Korean Patent Application No. 10-2021-0000989, filed on Jan. 5, 2021, Korean Patent Application No. 10-2021-0000991, filed on Jan. 5, 2021, U.S. Provisional Application No. 63/137,671, filed on Jan. 14, 2021, U.S. Provisional Application No. 63/143,006, filed on Jan. 28, 2021, and U.S. Provisional Application No. 63/144,481, filed on Feb. 2, 2021. The disclosures of the prior applications are incorporated by reference in their entirety.

TECHNICAL FIELD

The present disclosure relates to handling a state transition in a wireless communication system.

BACKGROUND

A wireless communication system is a multiple access system that supports communication with multiple users by sharing available system resources (e.g., bandwidth, transmission power, etc.). Examples of the multiple access system include a code division multiple access (CDMA) system, a frequency division multiple access (FDMA) system, a time division multiple access (TDMA) system, an orthogonal frequency division multiple access (OFDMA) system, and a single carrier frequency (SC-FDMA) system. There is a division multiple access (MC-FDMA) system and a multi carrier frequency division multiple access (MC-FDMA) system.

Sidelink (SL) communication is a communication scheme in which a direct link is established between User Equipments (UEs) and the UEs exchange voice and data directly with each other without intervention of an evolved Node B (eNB). SL communication is under consideration as a solution to the overhead of an eNB caused by rapidly increasing data traffic.

Vehicle-to-everything (V2X) refers to a communication technology through which a vehicle exchanges information with another vehicle, a pedestrian, an object having an infrastructure (or infra) established therein, and so on. The V2X may be divided into 4 types, such as vehicle-to-vehicle (V2V), vehicle-to-infrastructure (V2I), vehicle-to-network (V2N), and vehicle-to-pedestrian (V2P). The V2X communication may be provided via a PC5 interface and/or Uu interface.

Meanwhile, as a wider range of communication devices require larger communication capacities, the need for mobile broadband communication that is more enhanced than the existing Radio Access Technology (RAT) is rising. Accordingly, discussions are made on services and user equipment (UE) that are sensitive to reliability and latency. And, a next generation radio access technology that is based on the enhanced mobile broadband communication, massive Machine Type Communication (MTC), Ultra-Reliable and Low Latency Communication (URLLC), and so on, may be referred to as a new radio access technology (RAT) or new radio (NR). Herein, the NR may also support vehicle-to-everything (V2X) communication.

FIG. 1 is a drawing for describing V2X communication based on NR, compared to V2X communication based on RAT used before NR.

Regarding V2X communication, a scheme of providing a safety service, based on a V2X message such as Basic Safety Message (BSM), Cooperative Awareness Message (CAM), and Decentralized Environmental Notification Message (DENM) is focused in the discussion on the RAT used before the NR. The V2X message may include position information, dynamic information, attribute information, or the like. For example, a UE may transmit a periodic message type CAM and/or an event triggered message type DENM to another UE.

For example, the CAM may include basic vehicle information such as vehicle dynamic state information such as direction and speed, vehicle static data such as dimensions, external lighting conditions, and route details. For example, the UE may broadcast CAM, and the latency of CAM may be less than 100 ms. For example, when an unexpected situation such as a vehicle breakdown or an accident occurs, a UE may generate a DENM and transmit it to another UE. For example, all vehicles within the transmission range of the UE can receive CAM and/or DENM. In this case, DENM may have a higher priority than CAM.

Thereafter, regarding V2X communication, various V2X scenarios are proposed in NR. For example, the various V2X scenarios may include vehicle platooning, advanced driving, extended sensors, remote driving, or the like.

For example, based on vehicle platooning, vehicles can dynamically form groups and move together. For example, to perform platoon operations based on vehicle platooning, vehicles belonging to the group may receive periodic data from the lead vehicle. For example, vehicles belonging to the group may shorten or widen the distance between vehicles using periodic data.

For example, based on enhanced driving, vehicles can be semi-automated or fully automated. For example, each vehicle may adjust trajectories or maneuvers based on data obtained from local sensors of proximate vehicles and/or proximate logical entities. Also, for example, each vehicle may mutually share driving intention with nearby vehicles.

For example, based on extended sensors, raw data or processed data obtained through local sensors, or live video data may be used for vehicles, logical entities, UEs of pedestrians, and/or may be interchanged between V2X application servers. Thus, for example, a vehicle can recognize an environment that is more advanced than an environment that can be sensed using its own sensors.

For example, based on remote driving, for a person who cannot drive or a remote vehicle located in a dangerous environment, a remote driver or V2X application may operate or control the remote vehicle. For example, when a route can be predicted, such as in public transportation, cloud computing-based driving may be used to operate or control the remote vehicle. Also, for example, access to a cloud-based back-end service platform can be considered for remote driving.

Meanwhile, ways to specify service requirements for various V2X scenarios, such as vehicle platooning, enhanced driving, extended sensors, and remote driving, are being discussed in NR-based V2X communication.

In a wireless communication system, RRC states of a plurality of nodes involved in communication may be transited. In this case, when the RRC state of the second node known by the first node and the RRC state of the second node known by the second node are different, a problem may occur. Thus, when multiple nodes are involved in communication, these state transitions need to be properly handled.

TECHNICAL SUMMARY

The present disclosure provides a method and apparatus for handling a state transition in a wireless communication system.

The present disclosure provides a method and apparatus for handling a state transition during a relay operation in a wireless communication system.

According to an embodiment of the present disclosure, a method performed by a first user equipment (UE) in a wireless communication system comprises: monitoring a paging for a second UE in a first state; obtaining state information indicating that a state of the second UE has changed from the first state to a second state; and based on obtaining the state information, stopping the monitoring of the paging for the second UE in the second state, wherein the first state comprises at least one of an idle state or an inactive state, and wherein the second state comprises a connected state.

According to an embodiment of the present disclosure, a first user equipment (UE) in a wireless communication system comprises: a transceiver; a memory; and at least one processor operatively coupled to the transceiver and the memory, wherein the at least one processor is configured to: monitor a paging for a second UE in a first state; obtain state information indicating that a state of the second UE has changed from the first state to a second state; and based on obtaining the state information, stop the monitoring of the paging for the second UE in the second state, wherein the first state comprises at least one of an idle state or an inactive state, and wherein the second state comprises a connected state.

According to an embodiment of the present disclosure, a non-transitory computer readable medium has stored thereon a plurality of instructions that, when executed by a processor of a first user equipment (UE), perform operations comprising: monitoring a paging for a second UE in a first state; obtaining state information indicating that a state of the second UE has changed from the first state to a second state; and based on obtaining the state information, stopping the monitoring of the paging for the second UE in the second state, wherein the first state comprises at least one of an idle state or an inactive state, and wherein the second state comprises a connected state.

According to an embodiment of the present disclosure, a memory of a processor for a first user equipment (UE) in a wireless communication system stores a software code implementing instructions that, when executed by the processor, perform operations comprising: monitoring a paging for a second UE in a first state; obtaining state information indicating that a state of the second UE has changed from the first state to a second state; and based on obtaining the state information, stopping the monitoring of the paging for the second UE in the second state, wherein the first state comprises at least one of an idle state or an inactive state, and wherein the second state comprises a connected state.

According to an embodiment of the present disclosure, a method performed by a base station (BS) in a wireless communication system comprises receiving, from a first user equipment (UE) in an inactive state, a request message for a state change request of a second UE in a first state; based on receiving the request message, determining that the first UE has transitioned from the inactive state to a connected state; transmitting, to the first UE, a response message for an acknowledgement of the status change request of the second UE; after transmitting the response message, determining a state change of the second UE that the state of the second UE has changed from the first state to a second state; and stopping a transmission of a paging for the second UE based on the status change of the second UE, wherein the first state comprises at least one of an idle state or the inactive state, and wherein the second state comprises the connected state.

According to an embodiment of the present disclosure, a base station (BS) in a wireless communication system comprises: a transceiver; a memory; and at least one processor operatively coupled to the transceiver and the memory, wherein the at least one processor is configured to: control the transceiver to receive, from a first user equipment (UE) in an inactive state, a request message for a state change request of a second UE in a first state; based on receiving the request message, determine that the first UE has transitioned from the inactive state to a connected state; control the transceiver to transmit, to the first UE, a response message for an acknowledgement of the status change request of the second UE; after transmitting the response message, determine a state change of the second UE that the state of the second UE has changed from the first state to a second state; and stop a transmission of a paging for the second UE based on the status change of the second UE, wherein the first state comprises at least one of an idle state or the inactive state, and wherein the second state comprises the connected state.

The present disclosure may have various effects.

For example, unnecessary operation that may occur due to incorrect assumption of the RRC state of the remote UE can be prevented by the relay UE obtaining information for the state transition of the remote UE.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

BRIEF DESCRIPTION OF THE DRAWINGS

FIG. 3 shows a radio protocol architecture, in accordance with an embodiment of the present disclosure.

FIG. 18 shows another example of a wireless device, in accordance with an embodiment of the present disclosure.

DETAILED DESCRIPTION

Figure 1:
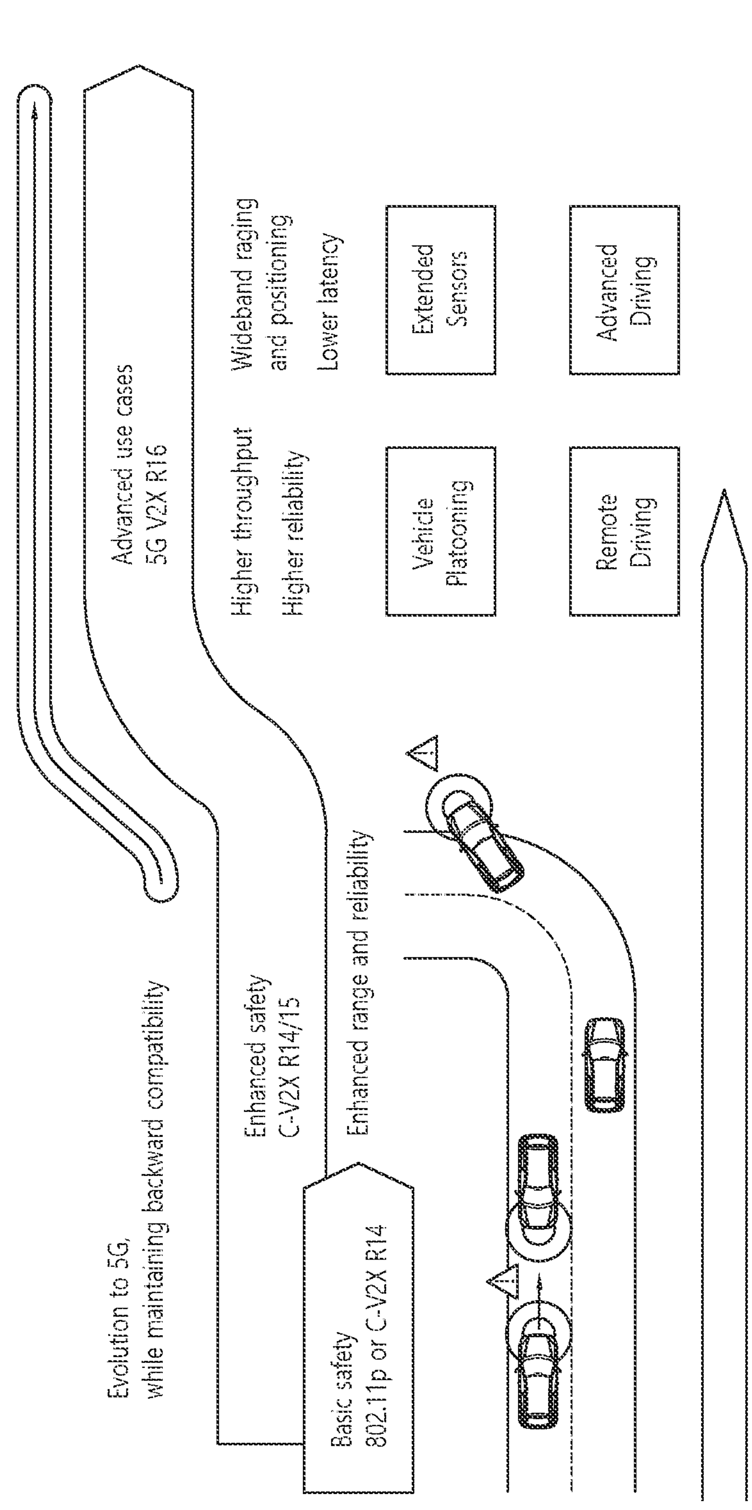
FIG. 1 is a drawing for describing V2X communication based on NR, compared to V2X communication based on RAT used before NR.

In the present specification, "A or B" may mean "only A", "only B" or "both A and B." In other words, in the present specification, "A or B" may be interpreted as "A and/or B". For example, in the present specification, "A, B, or C" may mean "only A", "only B", "only C", or "any combination of A, B, C".

A slash (/) or comma used in the present specification may mean "and/or". For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" may be interpreted as "at least one of A and B".

In addition, in the present specification, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present specification may mean "for example". Specifically, when indicated as "control information (PDCCH)", it may mean that "PDCCH" is proposed as an example of the "control information". In other words, the "control information" of the present specification is not limited to "PDCCH", and "PDDCH" may be proposed as an example of the "control information". In addition, when indicated as "control information (i.e., PDCCH)", it may also mean that "PDCCH" is proposed as an example of the "control information".

A technical feature described individually in one figure in the present specification may be individually implemented, or may be simultaneously implemented.

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA may be implemented with a radio technology, such as universal terrestrial radio access (UTRA) or CDMA-2000. The TDMA may be implemented with a radio technology, such as global system for mobile communications (GSM)/general packet ratio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and so on. IEEE 802.16m is an evolved version of IEEE 802.16e and provides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a successive technology of LTE-A corresponding to a new Clean-slate type mobile communication system having the characteristics of high performance, low latency, high availability, and so on. 5G NR may use resources of all spectrum available for usage including low frequency bands of less than 1 GHz, middle frequency bands ranging from 1 GHz to 10 GHz, high frequency (millimeter waves) of 24 GHz or more, and so on.

For clarity in the description, the following description will mostly focus on LTE-A or 5G NR. However, technical features according to an embodiment of the present disclosure will not be limited only to this.

Figure 2:
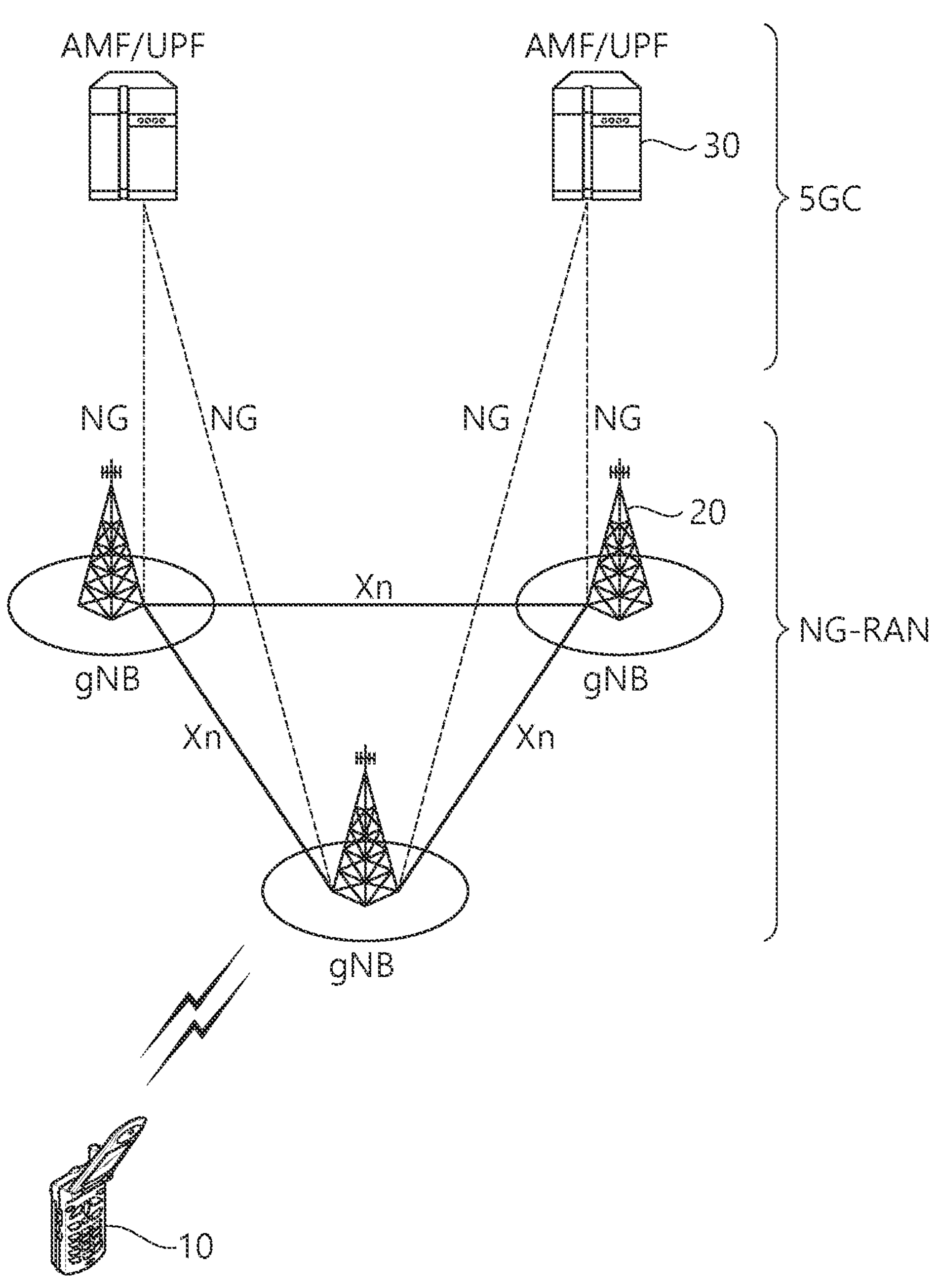
FIG. 2 shows a structure of an NR system, in accordance with an embodiment of the present disclosure.

FIG. 2 shows a structure of an NR system, in accordance with an embodiment of the present disclosure. The embodiment of FIG. 2 may be combined with various embodiments of the present disclosure.

Referring to FIG. 2, a next generation-radio access network (NG-RAN) may include a BS 20 providing a UE 10 with a user plane and control plane protocol termination. For example, the BS 20 may include a next generation-Node B (gNB) and/or an evolved-NodeB (eNB). For example, the UE 10 may be fixed or mobile and may be referred to as other terms, such as a mobile station (MS), a user terminal (UT), a subscriber station (SS), a mobile terminal (MT), wireless device, and so on. For example, the BS may be referred to as a fixed station which communicates with the UE 10 and may be referred to as other terms, such as a base transceiver system (BTS), an access point (AP), and so on.

The embodiment of FIG. 2 exemplifies a case where only the gNB is included. The BSs 20 may be connected to one another via Xn interface. The BS 20 may be connected to one another via 5th generation (5G) core network (5GC) and NG interface. More specifically, the BSs 20 may be connected to an access and mobility management function (AMF) 30 via NG-C interface, and may be connected to a user plane function (UPF) 30 via NG-U interface.

Layers of a radio interface protocol between the UE and the network can be classified into a first layer (layer 1, L1), a second layer (layer 2, L2), and a third layer (layer 3, L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

FIG. 3 shows a radio protocol architecture, in accordance with an embodiment of the present disclosure. The embodiment of FIG. 3 may be combined with various embodiments of the present disclosure. Specifically, (a) of FIG. 3 shows a radio protocol stack of a user plane for Uu communication, and (b) of FIG. 3 shows a radio protocol stack of a control plane for Uu communication. (c) of FIG. 3 shows a radio protocol stack of a user plane for SL communication, and (d) of FIG. 3 shows a radio protocol stack of a control plane for SL communication.

Referring to FIG. 3, a physical layer provides an upper layer with an information transfer service through a physical channel. The physical layer is connected to a medium access control (MAC) layer which is an upper layer of the physical layer through a transport channel. Data is transferred between the MAC layer and the physical layer through the transport channel. The transport channel is classified according to how and with what characteristics data is transmitted through a radio interface.

Between different physical layers, i.e., a physical layer of a transmitter and a physical layer of a receiver, data are transferred through the physical channel. The physical channel is modulated using an orthogonal frequency division multiplexing (OFDM) scheme, and utilizes time and frequency as a radio resource.

The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. The MAC layer provides data transfer services over logical channels.

The RLC layer performs concatenation, segmentation, and reassembly of Radio Link Control Service Data Unit (RLC SDU). In order to ensure diverse quality of service (QoS) required by a radio bearer (RB), the RLC layer provides three types of operation modes, i.e., a transparent mode (TM), an unacknowledged mode (UM), and an acknowledged mode (AM). An AM RLC provides error correction through an automatic repeat request (ARQ).

A radio resource control (RRC) layer is defined only in the control plane. The RRC layer serves to control the logical channel, the transport channel, and the physical channel in association with configuration, reconfiguration and release of RBs. The RB is a logical path provided by the first layer (i.e., the physical layer or the PHY layer) and the second layer (i.e., a MAC layer, an RLC layer, a packet data convergence protocol (PDCP) layer, and a service data adaptation protocol (SDAP) layer) for data delivery between the UE and the network.

Functions of a packet data convergence protocol (PDCP) layer in the user plane include user data delivery, header compression, and ciphering. Functions of a PDCP layer in the control plane include control-plane data delivery and ciphering/integrity protection.

A service data adaptation protocol (SDAP) layer is defined only in a user plane. The SDAP layer performs mapping between a Quality of Service (QoS) flow and a data radio bearer (DRB) and QoS flow ID (QFI) marking in both DL and UL packets.

The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the E-UTRAN, the UE is in an RRC_CONNECTED state, and, otherwise, the UE may be in an RRC_IDLE state. In case of the NR, an RRC_INACTIVE state is additionally defined, and a UE being in the RRC_INACTIVE state may maintain its connection with a core network whereas its connection with the BS is released.

Data is transmitted from the network to the UE through a downlink transport channel. Examples of the downlink transport channel include a broadcast channel (BCH) for transmitting system information and a downlink-shared channel (SCH) for transmitting user traffic or control messages. Traffic of downlink multicast or broadcast services or the control messages can be transmitted on the downlink-SCH or an additional downlink multicast channel (MCH). Data is transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

Figure 4:
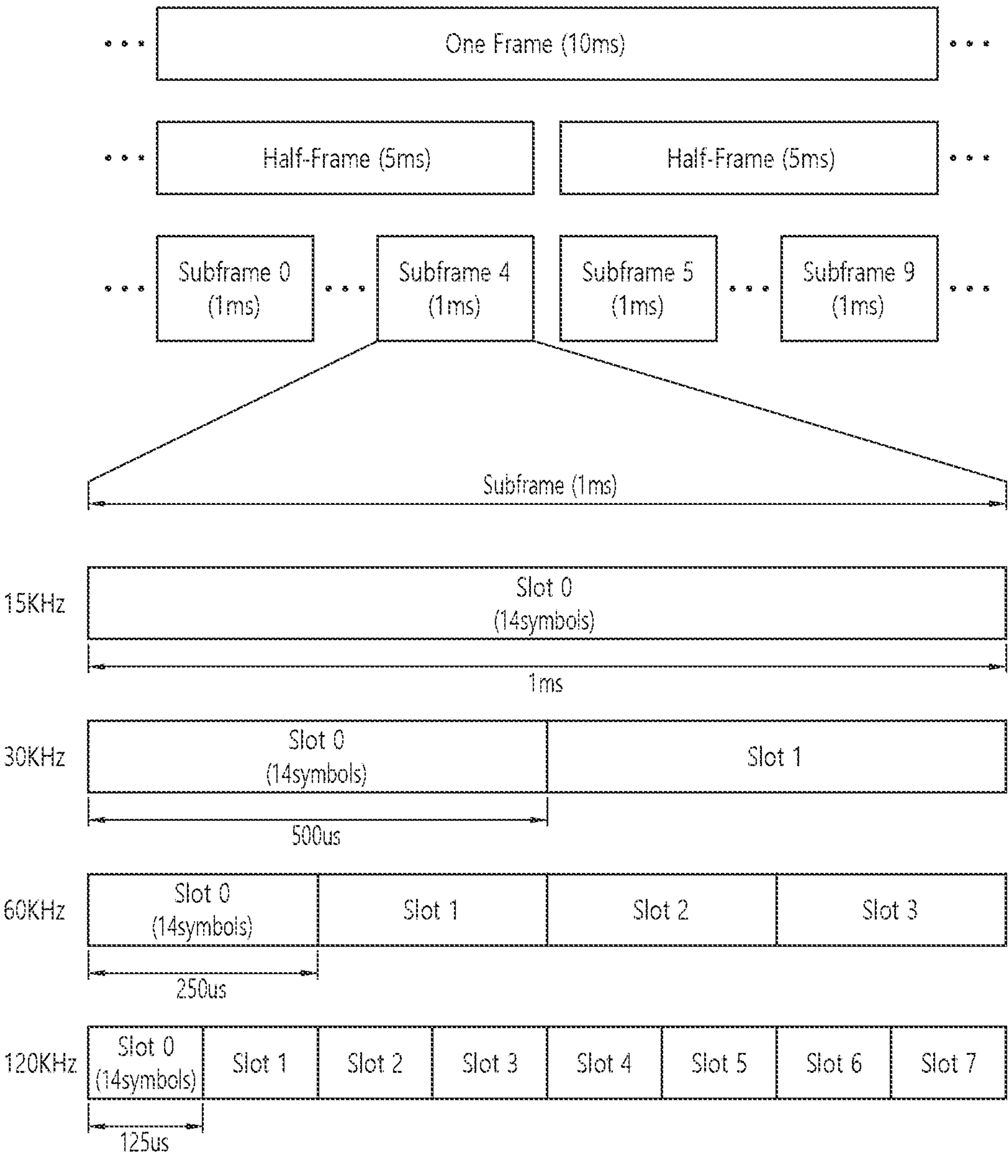
FIG. 4 shows a structure of a radio frame of an NR, in accordance with an embodiment of the present disclosure.

FIG. 4 shows a structure of a radio frame of an NR, in accordance with an embodiment of the present disclosure.

Referring to FIG. 4, in the NR, a radio frame may be used for performing uplink and downlink transmission. A radio frame has a length of 10 ms and may be defined to be configured of two half-frames (HFs). A half-frame may include five 1 ms subframes (SFs). A subframe (SF) may be divided into one or more slots, and the number of slots within a subframe may be determined in accordance with subcarrier spacing (SCS). Each slot may include 12 or 14 OFDM(A) symbols according to a cyclic prefix (CP).

In case of using a normal CP, each slot may include 14 symbols. In case of using an extended CP, each slot may include 12 symbols. Herein, a symbol may include an OFDM symbol (or CP-OFDM symbol) and a Single Carrier-FDMA (SC-FDMA) symbol (or Discrete Fourier Transform-spread-OFDM (DFT-s-OFDM) symbol).

Table 1 shown below represents an example of a number of symbols per slot ($N^{slot}_{symb}$), a number slots per frame ($N^{frame,u}_{slot}$), and a number of slots per subframe ($N^{subframe,u}_{slot}$) in accordance with an SCS configuration (u), in a case where a normal CP is used.

TABLE 1

| SCS ($15*2^u$) | $N^{slot}_{symb}$ | $N^{frame,u}_{slot}$ | $N^{subframe,u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 shows an example of a number of symbols per slot, a number of slots per frame, and a number of slots per subframe in accordance with the SCS, in a case where an extended CP is used.

TABLE 2

| SCS ($15*2^u$) | $N^{slot}_{symb}$ | $N^{frame,u}_{slot}$ | $N^{subframe,u}_{slot}$ |
|---|---|---|---|
| 60 KHz (u = 2) | 12 | 40 | 4 |

In an NR system, OFDM(A) numerologies (e.g., SCS, CP length, and so on) between multiple cells being integrate to one UE may be differently configured. Accordingly, a (absolute time) duration (or section) of a time resource (e.g., subframe, slot or TTI) (collectively referred to as a time unit (TU) for simplicity) being configured of the same number of symbols may be differently configured in the integrated cells. In the NR, multiple numerologies or SCSs for supporting diverse 5G services may be supported. For example, in case an SCS is 15 kHz, a wide area of the conventional cellular bands may be supported, and, in case an SCS is 30 kHz/60 kHz a dense-urban, lower latency, wider carrier bandwidth may be supported. In case the SCS is 60 kHz or higher, a bandwidth that is greater than 24.25 GHz may be used in order to overcome phase noise.

An NR frequency band may be defined as two different types of frequency ranges. The two different types of frequency ranges may be FR1 and FR2. The values of the frequency ranges may be changed (or varied), and, for example, the two different types of frequency ranges may be as shown below in Table 3. Among the frequency ranges that are used in an NR system, FR1 may mean a "sub 6 GHz range", and FR2 may mean an "above 6 GHz range" and may also be referred to as a millimeter wave (mmW).

TABLE 3

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

As described above, the values of the frequency ranges in the NR system may be changed (or varied). For example, as shown below in Table 4, FR1 may include a band within a range of 410 MHz to 7125 MHz. More specifically, FR1 may include a frequency band of 6 GHz (or 5850, 5900, 5925 MHz, and so on) and higher. For example, a frequency band of 6 GHz (or 5850, 5900, 5925 MHz, and so on) and higher being included in FR1 mat include an unlicensed band. The unlicensed band may be used for diverse purposes, e.g., the unlicensed band for vehicle-specific communication (e.g., automated driving).

TABLE 4

| Frequency Range designation | Corresponding frequency range | Subcarrier Spacing (SCS) |
|---|---|---|
| FR1 | 410 MHz-7125 MHz | 15, 30, 60 kHz |
| FR2 | 24250 MHz-52600 MHz | 60, 120, 240 kHz |

Figure 5:
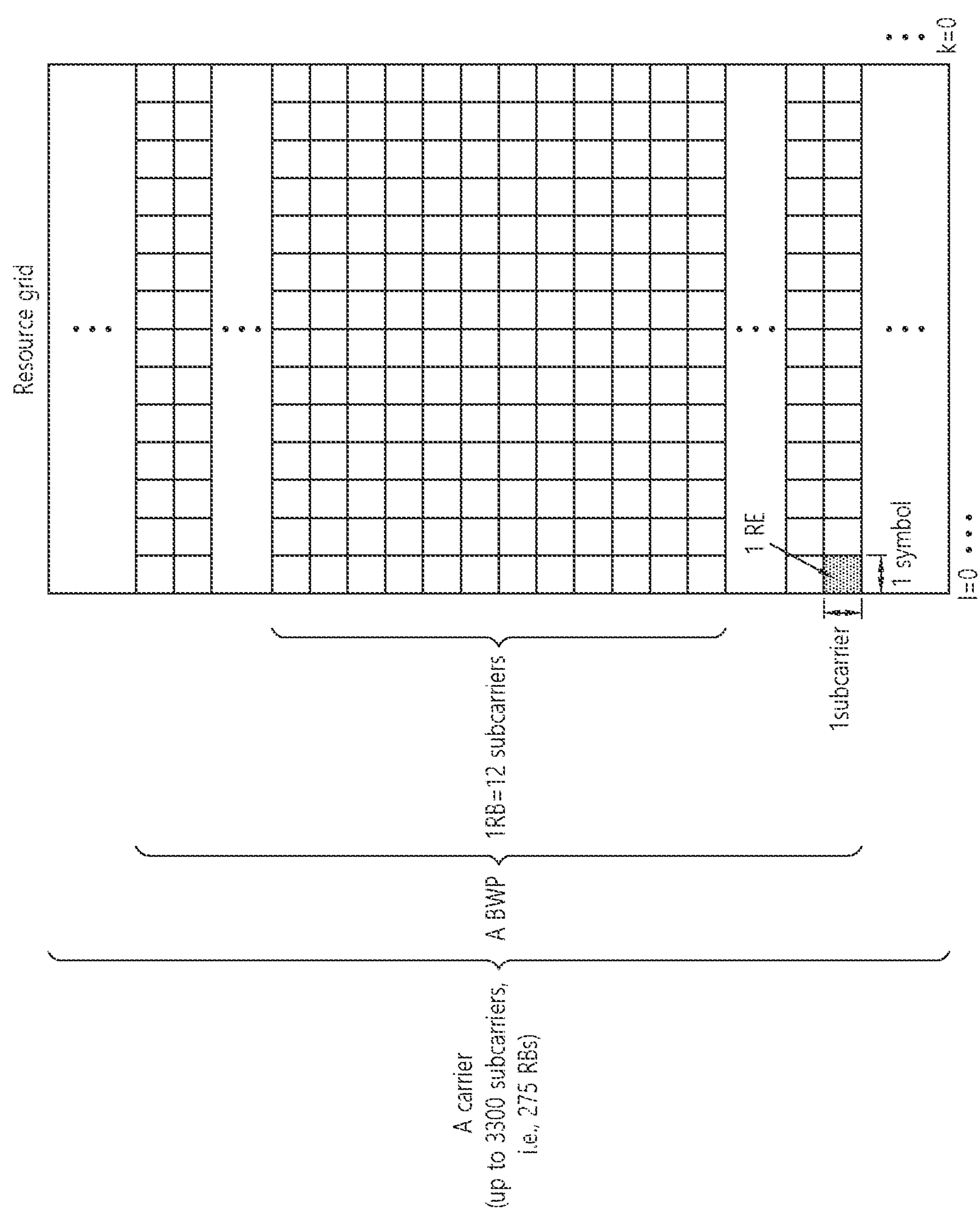
FIG. 5 shows a structure of a slot of an NR frame, in accordance with an embodiment of the present disclosure.

FIG. 5 shows a structure of a slot of an NR frame, in accordance with an embodiment of the present disclosure. Referring to FIG. 5, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols.

A carrier includes a plurality of subcarriers in a frequency domain. A Resource Block (RB) may be defined as a plurality of consecutive subcarriers (e.g., 12 subcarriers) in the frequency domain. A Bandwidth Part (BWP) may be defined as a plurality of consecutive (Physical) Resource Blocks ((P)RBs) in the frequency domain, and the BWP may correspond to one numerology (e.g., SCS, CP length, and so on). A carrier may include a maximum of N number BWPs (e.g., 5 BWPs). Data communication may be performed via an activated BWP. Each element may be referred to as a Resource Element (RE) within a resource grid and one complex symbol may be mapped to each element.

Meanwhile, a radio interface between a UE and a UE or a radio interface between a UE and a network may be comprise a first layer, an L2 layer, and an L3 layer. In various embodiments of the present disclosure, layer 1 may mean a physical layer. Also, for example, the L2 layer may mean at least one of a MAC layer, an RLC layer, a PDCP layer, or an SDAP layer. Also, for example, the L3 layer may mean an RRC layer.

Hereinafter, V2X or SL communication will be described.

Figure 6:
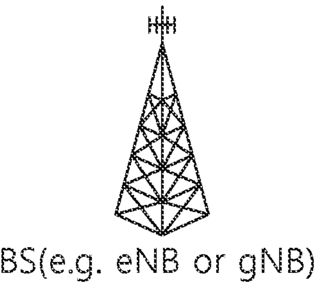
FIG. 6 shows an example of a BWP, in accordance with an embodiment of the present disclosure.
Figure 6:

FIG. 6 shows a UE performing V2X or SL communication, in accordance with an embodiment of the present disclosure. The embodiment of FIG. 6 may be combined with various embodiments of the present disclosure.

Referring to FIG. 6, in V2X or SL communication, the term 'UE' may generally imply a UE of a user. However, if a network equipment such as a BS transmits/receives a signal according to a communication scheme between UEs, the BS may also be regarded as a sort of the UE. For example, a UE 1 may be a first apparatus 100, and a UE 2 may be a second apparatus 200.

For example, the UE 1 may select a resource unit corresponding to a specific resource in a resource pool which implies a set of series of resources. In addition, the UE 1 may transmit an SL signal by using the resource unit. For example, a resource pool in which the UE 1 is capable of transmitting a signal may be configured to the UE 2 which is a receiving UE, and the signal of the UE 1 may be detected in the resource pool.

Herein, if the UE 1 is within a connectivity range of the BS, the BS may inform the UE 1 of the resource pool. Otherwise, if the UE 1 is out of the connectivity range of the BS, another UE may inform the UE 1 of the resource pool, or the UE 1 may use a pre-configured resource pool.

In general, the resource pool may be configured in unit of a plurality of resources, and each UE may select a unit of one or a plurality of resources to use it in SL signal transmission thereof.

Resource pools can be subdivided into several types. For example, according to the content of the SL signal transmitted in each resource pool, the resource pool may be classified as follows.

(1) Scheduling Assignment (SA) may be a signal comprising information such as a location of the resource used by the transmitting UE for transmission of the SL data channel, MCS (Modulation and Coding Scheme) required for demodulation of data channels or MIMO (Multiple Input Multiple Output) transmission scheme, TA (Timing Advance). SA can also be multiplexed and transmitted together with SL data on the same resource unit. In this case, the SA resource pool may mean a resource pool in which SA is multiplexed with SL data and transmitted. SA may also be referred to as an SL control channel.

(2) SL data channel (Physical Sidelink Shared Channel, PSSCH) may be a resource pool used by a transmitting UE to transmit user data. If SA is multiplexed and transmitted together with SL data on the same resource unit, only the SL data channel in a form excluding SA information can be transmitted in the resource pool for the SL data channel. In other words, Resource Elements (REs) used to transmit SA information on separate resource units in the SA resource pool may still be used to transmit SL data in the resource pool of the SL data channel. For example, the transmitting UE may transmit the PSSCH by mapping it to consecutive PRBs.

(3) A discovery channel may be a resource pool for a transmitting UE to transmit information such as its own ID. Through this, the transmitting UE can allow neighbour UEs to discover themselves.

Even when the contents of the SL signals described above are the same, different resource pools may be used according to transmission/reception properties of the SL signals. For example, even for the same SL data channel or discovery message, depending on a method for determining the transmission timing of the SL signal (e.g., whether it is transmitted at the reception time of the synchronization reference signal or transmitted by applying a certain timing advance at the reception time), resource allocation method (e.g., whether the base station assigns separate signal transmission resources to separate transmission UEs or whether separate transmission UEs select separate signal transmission resources within the resource pool), signal format (e.g., the number of symbols occupied by each SL signal in one subframe, or the number of subframes used for transmission of one SL signal), signal strength from a base station, transmit power strength of an SL UE, etc., resource pools may be divided into different resource pools.

UE 2 may perform indirect communication with the base station through UE 1. Such indirect communication may be performed through an access link (or Uu link) between UE 1 and the base station and a sidelink between UE 1 and UE 2. UE 1 may relay signal transmission between the base station and UE 2. In this case, UE 1 may be referred to as a relay UE, and UE 2 may be referred to as a remote UE. A connection that UE 2 establishes with UE 1 and/or a base station to perform indirect communication may be referred to as an indirect connection.

For example, the remote UE may be within the connection range (in-coverage) of the base station. In this case, the remote UE may be within the connection range of the same base station as the relay UE or may be within the connection range of different base station.

As another example, the remote UE may be outside the connection range of the base station (out-of-coverage).

On the other hand, UE 2 may perform direct communication with the base station without relaying of UE 1. Such direct communication may be performed through an access link (or Uu link) between UE 2 and the base station. A connection that UE 2 establishes with a base station to perform direct communication may be referred to as a direct connection.

For synchronization between UE 1 and UE 2, one UE may transmit a Sidelink Synchronization Signal (SLSS) to another UE. The SLSS may include a primary sidelink synchronization signal (PSSS) and a secondary sidelink synchronization signal (SSSS), as an SL-specific sequence. The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, a UE may use the S-PSS for initial signal detection and for synchronization acquisition. For example, the UE may use the S-PSS and the S-SSS for acquisition of detailed synchronization and for detection of a synchronization signal ID.

A physical sidelink broadcast channel (PSBCH) may be a (broadcast) channel for transmitting default (system) information which must be first known by the UE before SL signal transmission/reception. For example, the default information may be information related to SLSS, a duplex mode (DM), a time division duplex (TDD) uplink/downlink (UL/DL) configuration, information related to a resource pool, a type of an application related to the SLSS, a subframe offset, broadcast information, or the like. For example, for evaluation of PSBCH performance, in NR V2X, a payload size of the PSBCH may be 56 bits including 24-bit cyclic redundancy check (CRC).

The S-PSS, the S-SSS, and the PSBCH may be included in a block format (e.g., SL synchronization signal (SS)/PSBCH block, hereinafter, sidelink-synchronization signal block (S-SSB)) supporting periodical transmission. The S-SSB may have the same numerology (i.e., SCS and CP length) as a physical sidelink control channel (PSCCH)/physical sidelink shared channel (PSSCH) in a carrier, and a transmission bandwidth may exist within a (pre-) configured sidelink (SL) BWP. For example, the S-SSB may have a bandwidth of 11 resource blocks (RBs). For example, the PSBCH may exist across 11 RBs. In addition, a frequency position of the S-SSB may be (pre-)configured. Accordingly, the UE does not have to perform hypothesis detection at frequency to discover the S-SSB in the carrier.

Meanwhile, in the NR SL system, a plurality of numerologies having different SCS and/or CP lengths may be supported. In this case, as the SCS increases, the length of time resources through which the transmitting UE transmits the S-SSB may be shortened. Accordingly, coverage of the S-SSB may decrease. Therefore, in order to guarantee coverage of the S-SSB, the transmitting UE may transmit one or more S-SSBs to the receiving UE within one S-SSB transmission period according to the SCS. For example, the number of S-SSBs that the transmitting UE transmits to the receiving UE within one S-SSB transmission period may be pre-configured or configured for the transmitting UE. For example, the S-SSB transmission period may be 160 ms. For example, for all SCSs, an S-SSB transmission period of 160 ms may be supported.

For example, when the SCS is 15 kHz in FR1, the transmitting UE may transmit one or two S-SSBs to the receiving UE within one S-SSB transmission period. For example, when the SCS is 30 kHz in FR1, the transmitting UE may transmit one or two S-SSBs to the receiving UE within one S-SSB transmission period. For example, when the SCS is 60 kHz in FR1, the transmitting UE may transmit one, two or four S-SSBs to the receiving UE within one S-SSB transmission period.

For example, when the SCS is 60 kHz in FR2, the transmitting UE can transmit 1, 2, 4, 8, 16 or 32 S-SSBs to the receiving UE within one S-SSB transmission period. there is. For example, if the SCS is 120 kHz in FR2, the transmitting UE may transmit 1, 2, 4, 8, 16, 32 or 64 S-SSBs to the receiving UE within one S-SSB transmission period.

Meanwhile, when the SCS is 60 kHz, two types of CPs may be supported. In addition, the structure of the S-SSB transmitted from the transmitting UE to the receiving UE may be different according to the CP type. For example, the CP type may be Normal CP (NCP) or Extended CP (ECP). Specifically, for example, when the CP type is NCP, the number of symbols mapped to the PSBCH in the S-SSB transmitted by the transmitting UE may be 9 or 8. On the other hand, for example, when the CP type is ECP, the number of symbols mapped to the PSBCH in the S-SSB transmitted by the transmitting UE may be 7 or 6. For example, a PSBCH may be mapped to a first symbol in an S-SSB transmitted by a transmitting UE. For example, a receiving UE receiving the S-SSB may perform an automatic gain control (AGC) operation in the first symbol interval of the S-SSB.

Hereinafter, resource allocation in SL will be described.

Figure 7:
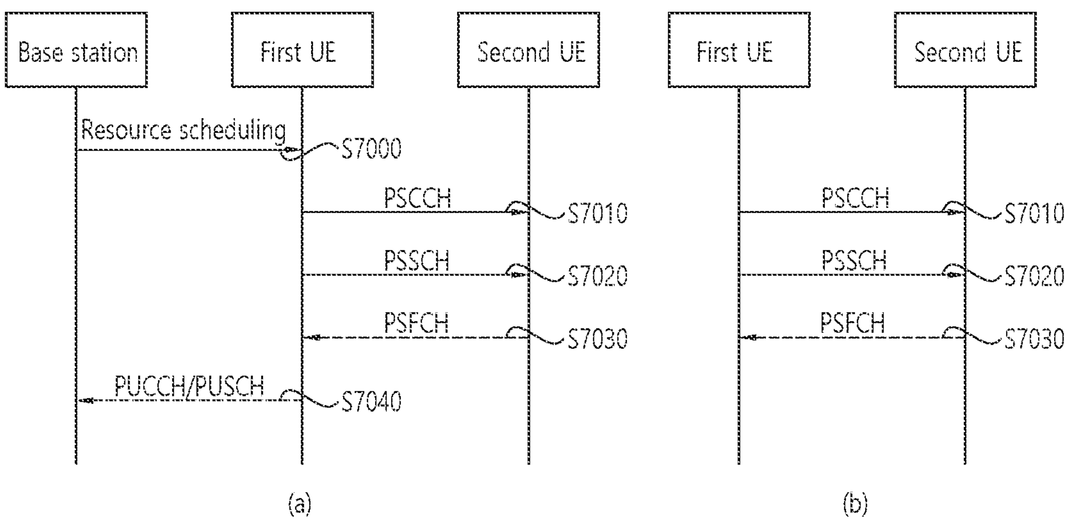
FIG. 7 shows a procedure of performing V2X or SL communication by a UE based on a transmission mode, in accordance with an embodiment of the present disclosure.

FIG. 7 shows a procedure of performing V2X or SL communication by a UE based on a transmission mode, in accordance with an embodiment of the present disclosure. The embodiment of FIG. 7 may be combined with various embodiments of the present disclosure. In various embodiments of the present disclosure, the transmission mode may be called a mode or a resource allocation mode. Hereinafter, for convenience of explanation, in LTE, the transmission mode may be called an LTE transmission mode. In NR, the transmission mode may be called an NR resource allocation mode.

For example, (a) of FIG. 7 shows a UE operation related to an LTE transmission mode 1 or an LTE transmission mode 3. Alternatively, for example, (a) of FIG. 7 shows a UE operation related to an NR resource allocation mode 1. For example, the LTE transmission mode 1 may be applied to general SL communication, and the LTE transmission mode 3 may be applied to V2X communication.

For example, (b) of FIG. 7 shows a UE operation related to an LTE transmission mode 2 or an LTE transmission mode 4. Alternatively, for example, (b) of FIG. 7 shows a UE operation related to an NR resource allocation mode 2.

Referring to (a) of FIG. 7, in the LTE transmission mode 1, the LTE transmission mode 3, or the NR resource allocation mode 1, a BS may schedule an SL resource to be used by the UE for SL transmission. For example, in step S7000, the base station may transmit information related to SL resources and/or information related to UL resources to the first UE. For example, the UL resource may include a PUCCH resource and/or a PUSCH resource. For example, the UL resource may be a resource for reporting SL HARQ feedback to the base station.

For example, the first UE may receive information related to dynamic grant (DG) resources and/or information related to configured grant (CG) resources from the base station. For example, CG resources may include CG type 1 resources or CG type 2 resources. In this specification, the DG resource may be a resource configured/allocated by the base station to the first UE through downlink control information (DCI). In this specification, the CG resource may be a (periodic) resource configured/allocated by the base station to the first UE through a DCI and/or RRC message. For example, in the case of a CG type 1 resource, the base station may transmit an RRC message including information related to the CG resource to the first UE. For example, in the case of a CG type 2 resource, the base station may transmit an RRC message including information related to the CG resource to the first UE, and the base station may transmit a DCI related to activation or release of the CG resource to the first UE.

In step S7010, the first UE may transmit a PSCCH (e.g., Sidelink Control Information (SCI) or 1st-stage SCI) to the second UE based on the resource scheduling. In step S7020, the first UE may transmit a PSSCH (e.g., 2nd-stage SCI, MAC PDU, data, etc.) related to the PSCCH to the second UE. In step S7030, the first UE may receive the PSFCH related to the PSCCH/PSSCH from the second UE. For example, HARQ feedback information (e.g., NACK information or ACK information) may be received from the second UE through the PSFCH. In step S7040, the first UE may transmit/report HARQ feedback information to the base station through PUCCH or PUSCH. For example, the HARQ feedback information reported to the base station may be information that the first UE generates based on the HARQ feedback information received from the second UE. For example, the HARQ feedback information reported to the base station may be information generated by the first UE based on a rule configured in advance. For example, the DCI may be a DCI for SL scheduling. For example, the format of the DCI may be DCI format 3_0 or DCI format 3_1.

Referring to (b) of FIG. 7, in the LTE transmission mode 2, the LTE transmission mode 4, or the NR resource allocation mode 2, the UE may determine an SL transmission resource within an SL resource configured by a BS/network or a pre-configured SL resource. For example, the configured SL resource or the pre-configured SL resource may be a resource pool. For example, the UE may autonomously select or schedule a resource for SL transmission. For example, the UE may perform SL communication by autonomously selecting a resource within a configured resource pool. For example, the UE may autonomously select a resource within a selective window by performing a sensing and resource (re)selection procedure. For example, the sensing may be performed in unit of subchannels. For example, in step S7010, the first UE that has selected a resource within the resource pool can transmit a PSCCH (e.g., Sidelink Control Information (SCI) or 1st-stage SCI) to the second UE using the resource. In step S7020, the first UE may transmit a PSSCH (e.g., 2nd-stage SCI, MAC PDU, data, etc.) related to the PSCCH to the second UE. In step S7030, the first UE may receive the PSFCH related to the PSCCH/PSSCH from the second UE.

Referring to (a) or (b) of FIG. 7, for example, UE 1 may transmit SCI to UE 2 on PSCCH. Alternatively, for example, UE 1 may transmit two consecutive SCI (e.g., 2-stage SCI) to UE 2 on PSCCH and/or PSSCH. In this case, UE 2 may decode two consecutive SCIs (e.g., 2-stage SCI) in order to receive the PSSCH from UE 1. In this specification, SCI transmitted on PSCCH may be referred to as a 1st SCI, first SCI, 1st-stage SCI or 1st-stage SCI format, and SCI transmitted on PSSCH may be referred to as 2nd SCI, second SCI, 2nd-stage SCI or a 2nd-stage SCI format. For example, the 1st-stage SCI format may include SCI format 1-A, and the 2nd-stage SCI format may include SCI format 2-A and/or SCI format 2-B.

Referring to (a) or (b) of FIG. 7, in step S7030, the first UE may receive the PSFCH. For example, UE 1 and UE 2 may determine a PSFCH resource, and UE 2 may transmit HARQ feedback to UE 1 using the PSFCH resource.

Referring to (a) of FIG. 7, in step S7040, the first UE may transmit SL HARQ feedback to the base station through PUCCH and/or PUSCH.

Hereinafter, a sidelink control information (SCI) will be described.

Control information transmitted by a BS to a UE through a PDCCH may be referred to as downlink control information (DCI), whereas control information transmitted by the UE to another UE through a PSCCH may be referred to as SCI. For example, the UE may know in advance a start symbol of the PSCCH and/or the number of symbols of the PSCCH, before decoding the PSCCH. For example, the SCI may include SL scheduling information. For example, the UE may transmit at least one SCI to another UE to schedule the PSSCH. For example, one or more SCI formats may be defined.

For example, a transmitting UE may transmit the SCI to a receiving UE on the PSCCH. The receiving UE may decode one SCI to receive the PSSCH from the transmitting UE.

For example, the transmitting UE may transmit two consecutive SCIs (e.g., 2-stage SCI) to the receiving UE on the PSCCH and/or the PSSCH. The receiving UE may decode the two consecutive SCIs (e.g., 2-stage SCI) to receive the PSSCH from the transmitting UE. For example, if SCI configuration fields are divided into two groups in consideration of a (relatively) high SCI payload size, an SCI including a first SCI configuration field group may be referred to as a first SCI or a 1st SCI, and an SCI including a second SCI configuration field group may be referred to as a second SCI or a 2nd SCI. For example, the transmitting UE may transmit the first SCI to the receiving UE through the PSCCH. For example, the transmitting UE may transmit the second SCI to the receiving UE on the PSCCH and/or the PSSCH. For example, the second SCI may be transmitted to the receiving UE through an (independent) PSCCH, or may be transmitted in a piggyback manner together with data through the PSSCH. For example, two consecutive SCIs may also be applied to different transmissions (e.g., unicast, broadcast, or groupcast).

For example, the transmitting UE may transmit the entirety or part of information described below to the receiving UE through the SCI. Herein, for example, the transmitting UE may transmit the entirety or part of the information described below to the receiving UE through the first SCI and/or the second SCI.

- PSSCH and/or PSCCH related resource allocation information, e.g., the number/positions of time/frequency resources, resource reservation information (e.g., period), and/or
- SL CSI report request indicator or SL (1) RSRP (and/or SL (1) RSRQ and/or SL (L1) RSSI) report request indicator, and/or
- SL CSI transmission indicator (or SL (1) RSRP (and/or SL (1) RSRQ and/or SL (L1) RSSI) information transmission indicator)) (on PSSCH), and/or
- MCS information, and/or
- Transmit power information, and/or
- 1 destination ID information and/or 1 source ID information, and/or
- SL HARQ process ID information, and/or
- New data indicator (NDI) information, and/or
- Redundancy version (RV) information, and/or
- (Transmission traffic/packet related) QoS information, e.g., priority information, and/or
- SL CSI-RS transmission indicator or information on the number of (to-be-transmitted) SL CSI-RS antenna ports,
- Location information of a transmitting UE or location (or distance region) information of a target receiving UE (for which SL HARQ feedback is requested), and/or
- Reference signal (e.g., DMRS, etc.) related to channel estimation and/or decoding of data to be transmitted through a PSSCH, e.g., information related to a pattern of a (time-frequency) mapping resource of DMRS, rank information, antenna port index information For example, the first SCI may include information related to channel sensing. For example, the receiving UE may decode the second SCI by using a PSSCH DMRS. A polar code used in a PDCCH may be applied to the second SCI. For example, in a resource pool, a payload size of the first SCI may be identical for unicast, groupcast, and broadcast. After decoding the first SCI, the receiving UE does not have to perform blind decoding of the second SCI. For example, the first SCI may include scheduling information of the second SCI.

Meanwhile, in various embodiments of the present disclosure, since the transmitting UE may transmit at least one of the SCI, the first SCI, and/or the second SCI to the receiving UE through the PSCCH, the PSCCH may be replaced/substituted with at least one of the SCI, the first SCI, and/or the second SCI. And/or, for example, the SCI may be replaced/substituted with at least one of the PSCCH, the first SCI, and/or the second SCI. And/or, for example, since the transmitting UE may transmit the second SCI to the receiving UE through the PSSCH, the PSSCH may be replaced/substituted with the second SCI.

Figure 8:
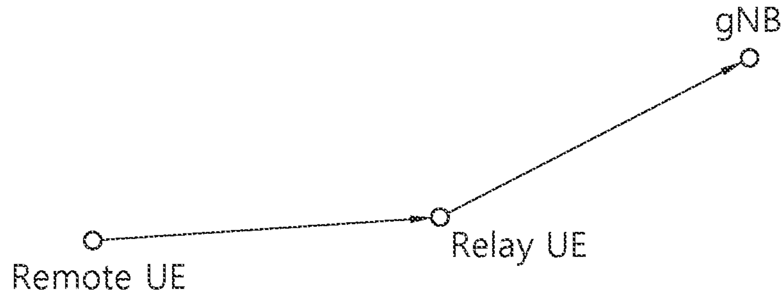
FIG. 8 shows an example of a UE-to-network relay according to an embodiment of the present disclosure.

FIG. 8 shows an example of a UE-to-network relay according to an embodiment of the present disclosure.

Referring to FIG. 8, a remote UE may perform indirect communication with a base station (e.g., gNB) through a relay UE. Such indirect communication may be performed through an access link (or Uu link) between the relay UE and the base station and a side link between the relay UE and the remote UE. The relay UE may relay signal transmission between the base station and the remote UE. When the remote UE performs indirect communication with the base station through the relay UE, a connection between the remote UE and the base station may be referred to as an indirect connection.

For example, the remote UE may be within the connection range of the base station (in-coverage). In this case, the remote UE may be within the connection range of the same base station as the relay UE or may be within the connection range of different base stations.

In addition, when the remote UE is within the connection range of the base station, the remote UE may perform direct communication with the base station without going through a relay UE. Such direct communication may be performed through an access link (or Uu link) between the remote UE and the base station. When the remote UE performs direct communication with the base station, a connection between the remote UE and the base station may be referred to as a direct connection.

As another example, the remote UE may be outside the connection range of the base station (out-of-coverage).

Figure 9:
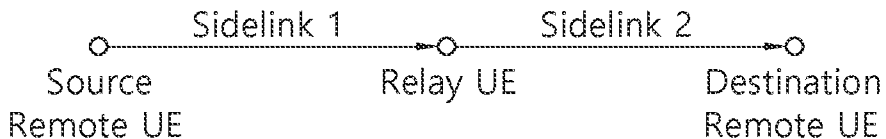
FIG. 9 shows an example of a UE-to-UE relay according to an embodiment of the present disclosure.

FIG. 9 shows an example of a UE-to-UE relay according to an embodiment of the present disclosure.

Referring to FIG. 9, a source remote UE may perform indirect communication with a destination remote UE through a relay UE. Such indirect communication may be performed through a first sidelink between the relay UE and the source remote UE and a second sidelink between the relay UE and the destination remote UE. The relay UE may relay signal transfer between the source remote UE and the destination remote UE. When the source remote UE performs indirect communication with the destination remote UE through the relay UE, the connection between the source remote UE and the destination remote UE may be referred to as an indirect connection.

For example, the source remote UE/relay UE/destination remote UE may be within the in-coverage of the base station. In this case, the source remote UE/relay UE/destination remote UE may be within the connection range of the same base station or may be within the connection range of different base stations.

In addition, when the source remote UE/relay UE/destination remote UE is within the connection range of the base station, the source remote UE/relay UE/destination remote UE may perform direct communication with the base station. Such direct communication may be performed through an access link (or Uu link) between the source remote UE/relay UE/destination remote UE and the base station. When the source remote UE/relay UE/destination remote UE communicates directly with the base station, the connection between the source remote UE/relay UE/destination remote UE and the base station may be referred to as direct connection.

As another example, the source remote UE/relay UE/destination remote UE may be outside the connection range of the base station (out-of-coverage).

Figure 10:
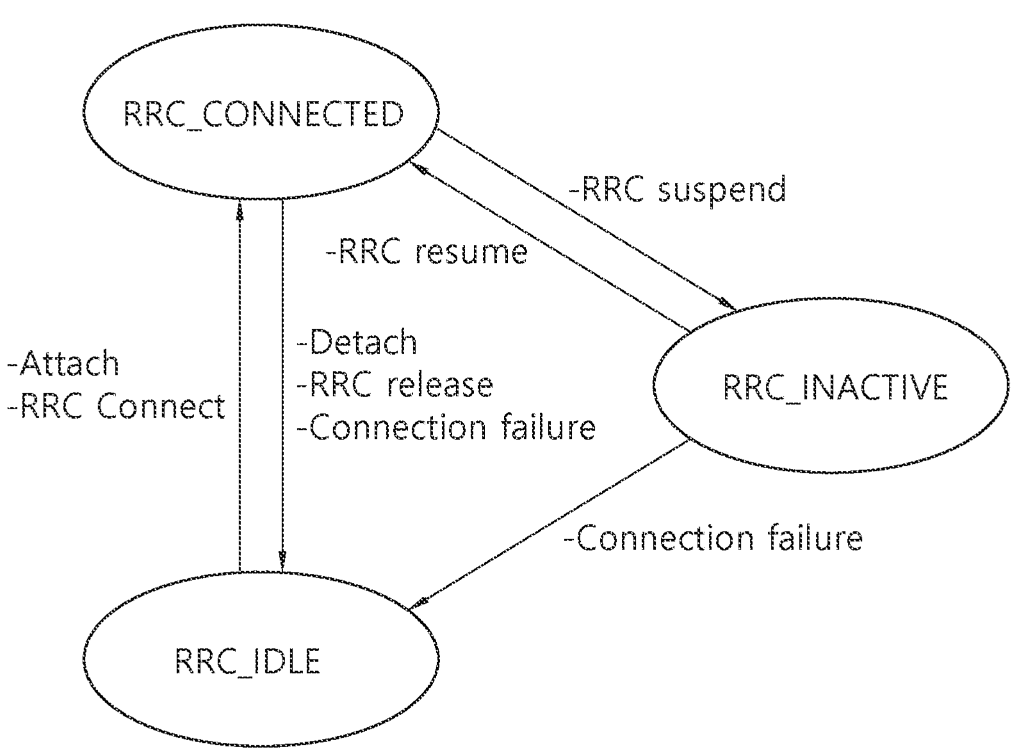
FIG. 10 shows an example of possible RRC states in a wireless communication system according to an embodiment of the present disclosure.

FIG. 10 shows an example of possible RRC states in a wireless communication system according to an embodiment of the present disclosure.

Referring to FIG. 10, three possible RRC states may exist in a wireless communication system. The three possible RRC states may include idle mode/state (i.e., RRC_IDLE), connected mode/state (i.e., RRC_CONNECTED) and/or inactive mode/state (i.e., RRC_INACTIVE).

In idle mode/state, an RRC context for communication between the UE and the network may not be established in the RAN, and the UE may not belong to any specific cell. Also, in idle mode/state, there may not be a core network connection to the UE. Since the UE is in sleep mode most of the time to reduce battery consumption, data transmission between the UE and the network may not occur. A UE in idle mode/state may wake up periodically to receive paging messages from the network. Mobility can be handled by the UE through cell reselection. Since uplink synchronization is not maintained, the UE may not perform uplink transmission other than random access transmission (i.e., random access preamble transmission) for transiting to the connected mode/state.

In connected mode/state, an RRC context for communication between the UE and the network may be established in the RAN. Also, in connected mode/state, a core network connection to the UE may be established. Since the UE belongs to a specific cell, a C-RNTI for signaling between the UE and the network may be configured for the UE. Data transmission between the UE and the network may occur. Mobility can be handled by the network—that is, the UE can provide measurement reports to the network, and the network can send mobility commands to the UE to perform mobility. Uplink timing alignment needs to be established based on random access and needs to be maintained for data transmission.

In the inactive mode/state, the RRC context for communication between the UE and the network may be maintained in the RAN. Data transmission between the UE and the network may not occur. Since the core network connection is maintained for the UE, the UE can quickly transition to a connected mode/state for data transmission. In transitioning to connected mode/state, core network signaling may not be required. The RRC context is already established in the network, and the transition to connected mode/state can be handled in the RAN. The UE may be allowed to be in sleep mode similarly to idle mode/state, and mobility may be handled through cell reselection without network involvement. An inactive mode/state can be understood as a combination of an idle mode/state and a connected mode/state.

As shown in FIG. 10, the UE may transition from idle mode/state to connected mode/state by performing an initial access procedure or an RRC connection establishment procedure. The RRC connection establishment procedure may be initiated by the UE transmitting an RRC setup request message to the network. If RRC connection establishment is successful, the UE may receive an RRC setup message from the network in response to the RRC setup request message. When the UE receives the RRC setup message from the network, the UE enters a connected mode/state and may transmit an RRC setup complete message to the network in response to the RRC setup message.

The UE may transition from connected mode/state to idle mode/state when detach, RRC connection release occurs, and/or connection failure (e.g., radio link failure (RLF)) occurs.

For example, when the UE receives an RRC connection release message, RRC connection release may occur.

For example, the UE and the base station may use the data inactivity timer to determine whether the UE's connected mode/state is maintained or whether the UE transitions to an idle mode/state. The data inactivity timer may operate as shown in Table 5 below:

TABLE 5

| |
|---|
| 5.19 Data inactivity monitoring<br>The UE may be configured by RRC with a Data inactivity monitoring functionality, when in RRC_CONNECTED. RRC controls Data inactivity operation by configuring the timer dataInactivityTimer.When dataInactivityTimer is configured, the UE shall:1>if any MAC entity receives a MAC SDU for DTCH logical channel, DCCH logical channel, or CCCH logical channel; or1>if any MAC entity transmits a MAC SDU for DTCH logical channel, or DCCH logical channel:2>start or restart dataInactivityTimer.1>if the dataInactivityTimer expires:2>indicate the expiry of the dataInactivityTimer to upper layers.5.3.8.5UE actions upon the expiry of DataInactivityTimerUpon receiving the expiry of DataInactivityTimer from lower layers while in RRC_CONNECTED, the UE shall:1>perform the actions upon going to RRC_IDLE as specified in 5.3.11, with release cause 'RRC connection failure'. |

That is, when the UE receives a MAC SDU from the network in the connected mode/state or generates a MAC SDU to be transmitted to the network, the UE may start or restart a data inactivity timer configured by the network. When the data inactivity timer expires, since no MAC SDU has been transmitted or received while the data inactivity timer is running, the UE can transition from the connected mode/state to the idle mode/state. The base station and the UE may determine the connected mode/state or the idle mode/state by starting the data inactivity timer, respectively, and when the mode/state is changed to idle, each base station and the UE do not notify the other of the state change. When an RRC connection is suspended, the UE can transition from connected mode/state to inactive mode/state.

For example, when the UE receives an RRC connection release message including suspend configuration, the RRC connection may be suspended.

When the RRC connection is resumed by performing an RRC connection resumption procedure, the UE may transition from the inactive mode/state to the connected mode/state. The RRC connection resume procedure may be initiated by the UE transmitting an RRC resume request message to the network. If RRC connection resumption is successful, the UE may receive an RRC resume message from the network in response to the RRC resume request message. When the UE receives the RRC resume message from the network, the UE enters the connected mode/state and may transmit an RRC resume complete message to the network in response to the RRC resume message.

The UE may transition from an inactive mode/state to an idle mode/state when a connection failure such as RLF occurs.

In UE-to-network relay, the possible RRC state combinations of relay UE and remote UE are as follows:

- a combination where the remote UE is in RRC_CONNECTED state and the relay UE is in RRC_CONNECTED state;
- a combination where the remote UE is in RRC_INACTIVE state and the relay UE is in RRC_CONNECTED state;
- a combination where the remote UE is in RRC_INACTIVE state and the relay UE is in RRC_INACTIVE state; and
- a combination where the remote UE is in RRC_IDLE state and the relay UE is in RRC_INACTIVE state.

According to above, when the remote UE is in the RRC_CONNECTED state, the relay UE must be in the RRC_CONNECTED state. Also, when the remote UE is in the RRC_INACTIVE state, the relay UE may be in the RRC_CONNECTED state or the RRC_INACTIVE state. Furthermore, when the remote UE is in the RRC_IDLE state, the relay UE may be in the RRC_INACTIVE state.

Even if the combination of RRC states supported between the remote UE and the relay UE is determined, since the relay UE cannot know the RRC state change of the remote UE, signaling for the relay UE to know the RRC state of the remote UE may be required.

Accordingly, the present disclosure proposes a method and apparatus for handling a case where an RRC state transition of a remote UE/relay UE occurs.

In addition, the present disclosure proposes a method and apparatus for resolving ambiguity of an inactivity timer when an RRC state transition of a remote UE/relay UE occurs.

In addition, the present disclosure proposes a method and apparatus for resolving a time ambiguity problem that may occur due to a delay caused by a relay operation when a remote UE and a base station operate a data inactivity timer for determining an RRC state transition.

Figure 11:
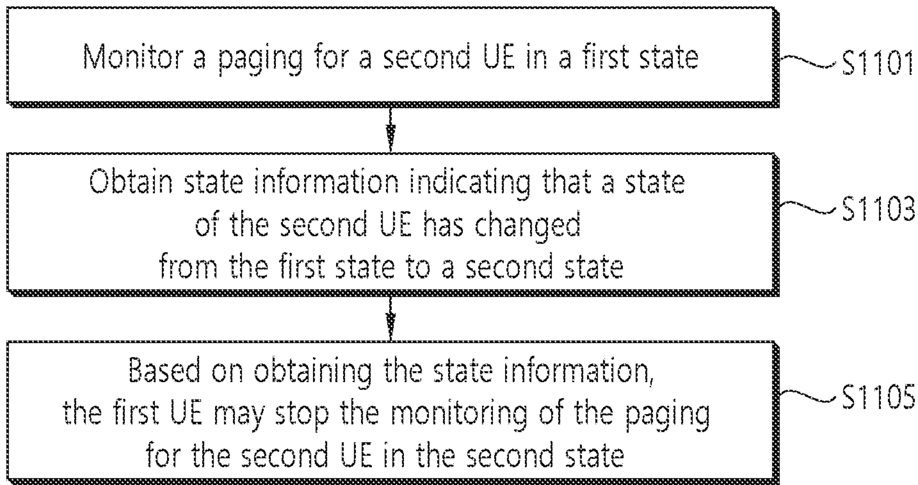
FIG. 11 shows an example of a method performed by a first UE according to an embodiment of the present disclosure.

FIG. 11 shows an example of a method performed by a first UE according to an embodiment of the present disclosure.

Referring to FIG. 11, in step S1101, the first UE may monitor a paging for a second UE in a first state. The first state may comprise at least one of an idle state or an inactive state.

In step S1103, the first UE may obtain state information indicating that a state of the second UE has changed from the first state to a second state. The second state may comprise a connected state.

In step S1105, based on obtaining the state information, the first UE may stop the monitoring of the paging for the second UE in the second state.

According to various embodiments, the first UE may be in the connected state while the second UE is in the connected state.

According to various embodiments, the first UE may not be in the idle state while the second UE is in the inactive state.

According to various embodiments, the first UE may be in the inactive state while the second UE is in the idle state.

According to various embodiments, the state information may comprise a message of which destination is set to a base station. The first UE may obtain the state information by receiving the message from the second UE.

According to various embodiments, the message may comprise a message for requesting transition to the connected state.

According to various embodiments, the state information may comprise indication information indicating that the second UE has transmitted a message for requesting a transition to the connected state to a base station. The first UE may obtain the status information by receiving the indication information from the second UE.

According to various embodiments, the first UE may receive a PC5-radio resource control (RRC) message comprising an RRC message and indication information indicating that the RRC message is a message for requesting a transition to the connected state from the second UE. The state information may comprise the indication information indicating that the RRC message is a message for requesting a transition to the connected state. The first UE may obtain the state information by identifying that the RRC message is a message for requesting a transition to the connected state, by decoding the indication information without decoding the RRC message in the PC5-RRC message. The indication information may be included in a header of the PC5-RRC message.

According to various embodiments, the message for requesting transition to the connected state may comprise at least one of a radio resource control (RRC) setup request message or an RRC resume request message.

According to various embodiments, the first UE may obtain the state information by receiving the state information from at least one of the second UE or a base station.

According to various embodiments, the first UE may transition from the inactive state to the connected state in response to obtaining the state information.

According to various embodiments, the first UE and the second UE may be autonomous vehicles that perform vehicle-to-everything (V2X) communication with each other.

According to various embodiments, a non-transitory computer readable medium has stored thereon a plurality of instructions that, when executed by a processor of a first user equipment (UE), perform operations comprising: monitoring a paging for a second UE in a first state; obtaining state information indicating that a state of the second UE has changed from the first state to a second state; and based on obtaining the state information, stopping the monitoring of the paging for the second UE in the second state, wherein the first state comprises at least one of an idle state or an inactive state, and wherein the second state comprises a connected state.

According to various embodiments, a memory of a processor for a first user equipment (UE) in a wireless communication system stores a software code implementing instructions that, when executed by the processor, perform operations comprising: monitoring a paging for a second UE in a first state; obtaining state information indicating that a state of the second UE has changed from the first state to a second state; and based on obtaining the state information, stopping the monitoring of the paging for the second UE in the second state, wherein the first state comprises at least one of an idle state or an inactive state, and wherein the second state comprises a connected state.

Figure 12:
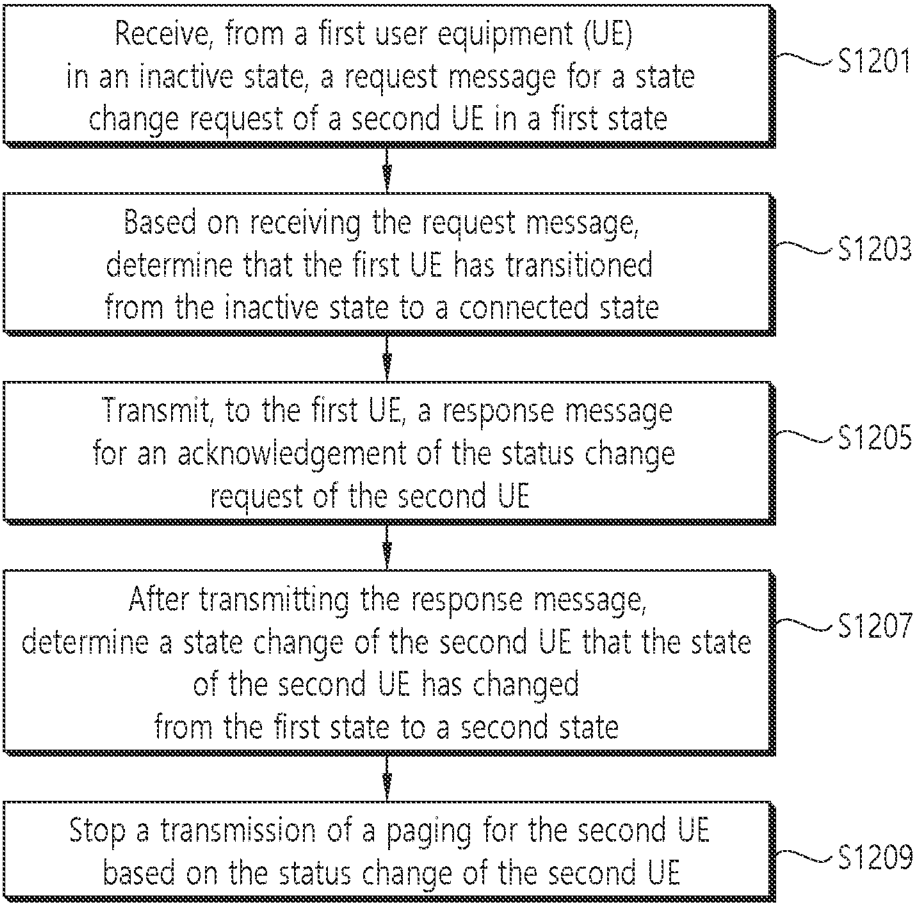
FIG. 12 shows an example of a method performed by a base station according to an embodiment of the present disclosure.

FIG. 12 shows an example of a method performed by a base station according to an embodiment of the present disclosure.

Referring to FIG. 12, in step S1201, the base station may receive, from a first user equipment (UE) in an inactive state, a request message for a state change request of a second UE in a first state. The first state may comprise at least one of an idle state or the inactive state.

In step S1203, the base station may, based on receiving the request message, determine that the first UE has transitioned from the inactive state to a connected state.

In step S1205, the base station may transmit, to the first UE, a response message for an acknowledgement of the status change request of the second UE.

In step S1207, the base station may, after transmitting the response message, determine a state change of the second UE that the state of the second UE has changed from the first state to a second state. The second state may comprise the connected state.

In step S1209, the base station may stop a transmission of a paging for the second UE based on the status change of the second UE.

Hereinafter, detailed examples for handling a case where an RRC state transition of a remote UE/relay UE occurs will be described.

I. In Case of RRC State Transition of Remote UE

When an RRC state transition of a remote UE occurs in a UE-to-network relay, the relay UE needs to know the RRC state transition of the remote UE. The remote UE can be managed as if it is directly RRC_CONNECTED to the gNB through the relay UE, and the relay UE performs an operation of relaying signals required for connection between the remote UE and the gNB. The relay UE transmits uplink/downlink data for the remote UE, and for this purpose, the relay UE may monitor the RNTI of the remote UE connected to the relay UE, the RNTI for the remote UE, and/or the RNTI related to the remote UE (e.g., C-RNTI, P-RNTI).

When the RRC state of the remote UE changes, the relay UE needs to know about the RRC state change of the remote UE. For example, when the remote UE transitions from the RRC_CONNECTED state to the RRC_INACTIVE/RRC_IDLE state, if the relay UE can know the RRC state transition of the remote UE, the relay UE can start/restart/resume monitoring of the RNTI for the remote UE (e.g., P-RNTI in paging occasion). In addition, when the RRC state of the remote UE is changed, since the TX pool information used by the remote UE is also changed, the relay UE can change the scheduling of the resource pool using information about the RRC state change of the remote UE.

When the RRC state of the remote UE changes from RRC_CONNECTED state to RRC_INACTIVE/IDLE state, the method of notifying the relay UE of the RRC state change of the remote UE is as follows:

- The remote UE may notify the relay UE that the RRC state of the remote UE has changed through sidelink RRC CONNECTION or PC5-S CONNECTION/PC5 RRC connection. For example, when the remote UE receives an RRC release message from the gNB, the RRC state of the remote UE changes from the RRC_CONNECTED state to the RRC_INACTIVE/IDLE state, and the remote UE changes the RRC state of the remote UE from the RRC_CONNECTED state to the RRC_INACTIVE/IDLE state. The change to the IDLE state may be notified to the relay UE.
- When the remote UE receives the RRC release message from the gNB, the remote UE may perform a sidelink RRC reconfiguration operation to release the LCID/SRB configured between the remote UE and the relay UE for relay operation. Alternatively, the remote UE may trigger the relay UE to release the LCID/SRB configured for relay operation between the remote UE and the relay UE. When the LCID/SRB configured for relay operation between the remote UE and the relay UE is released and all LCID/SRBs configured to support the relay operation of the remote UE are released, the relay UE may implicitly determine that the remote UE has transitioned to the RRC_IDLE/INACTIVE state.
- The gNB that has established a connection with the remote UE can notify the relay UE that the RRC state of the remote UE has changed in downlink through Uu link. For example, while transmitting an RRC release message to the remote UE, the gNB may also transmit a signal notifying that the remote UE has RRC-released to the relay UE.

In particular, when the RRC state of the remote UE changes from the RRC CONNECTED state to the RRC_IDLE state, the relay UE can know the RRC state change of the remote UE in the following way:

- The relay UE may directly determine the RRC state transition of the remote UE. For example, the relay UE may start a data inactivity timer for the remote UE. The relay UE may start a data inactivity timer for/related to each remote UE that has established a sidelink RRC/PC5-S connection with the relay UE. That is, the base station determines the RRC state transition of the remote UE based on the data inactivity timer, and the relay UE also starts the data inactivity timer for the RRC state transition of each remote UE to determine the RRC state transition of the remote UE. In this case, it is not necessary for the remote UE or gNB to inform the relay UE of the RRC state transition of the remote UE, but the relay UE has a data inactivity timer for determining the RRC state transition of each remote UE and starts the data inactivity timer. Through this, the relay UE can determine the RRC state transition of the remote UE by itself.

On the other hand, when the remote UE transitions from the RRC_INACTIVE/IDLE state to the RRC_CONNECTED state, if the relay UE can know the RRC state transition of the remote UE, since the relay UE may not monitor the remote UE's RNTI (e.g. P-RNTI in paging occasion), there is an advantage in that unnecessary operations of the relay UE can be reduced. The way for the relay UE to know that the remote UE has transitioned from the RRC_INACTIVE/IDLE state to the RRC_CONNECTED state is as follows:

- When the relay UE establishes a sidelink connection for relay operation with the remote UE and receives a message of which destination is gNB from the remote UE, or receives a message of which destination is gNB from a remote UE in RRC_INACTIVE/IDLE state, the relay UE may regard the message as an RRC setup request message and assume that the remote UE has transitioned to the RRC_CONNECTED state. If the relay UE is in the RRC_INACTIVE/IDLE state, upon receiving the message, the relay UE may also transition to the RRC_CONNECTED state.
- The remote UE that has transmitted the RRC setup request message to the gNB through the relay UE may notify the relay UE that the remote UE has transmitted the RRC setup request message to the gNB through the sidelink.
- Since the message transmitted from the remote UE to the relay UE is transmitted through sidelink, it may be transmitted in the form of a PC5-S message and/or a PC5-RRC message. When the RRC message is included in the PC5-S message and/or the PC5-RRC message, the header of the PC5-S message and/or the PC5-RRC message may include an indication indicating that the RRC message is included. The relay UE decodes only the above indication in the PC5-S message and/or the PC5-RRC message (i.e., without decoding the RRC message included in the PC5-S message and/or the PC5-RRC message), and when the RRC message included in the PC5-RRC message is an RRC setup request message, the relay UE may transition to the RRC_CONECTED state. Alternatively, only when the RRC message corresponds to the first RRC setup request, the header of the PC5-S message and/or the PC5-RRC message may include the indication.

When the remote UE transmits an RRC message using a relay operation, a new type of message may be defined other than the existing PC5-S message and/or PC5-RRC message. For example, if a "new PC5-S message and/or PC5-RRC message for transmitting an RRC message" is defined, the relay UE may decode only the corresponding message to determine whether to transition to the RRC_CONNECTED state. Alternatively, when the RRC setup request message is transmitted through the newly defined "new PC5-S message and/or PC5-RRC message for transmitting RRC message", the relay UE may be separately indicated that the RRC setup request message is transmitted through the new PC5-S message and/or PC5-RRC message. This is because the relay UE in the RRC_IDLE/INACTIVE state can transition to the RRC_CONNECTED state through this.

II. When the RRC State Transition of the Relay UE Occurs

The RRC state transition of the relay UE may be processed independently of the remote UE. For example, when uplink/downlink data related to the relay UE (e.g., data where the relay UE is set as a source node or a destination node) is not transmitted, the relay UE may transition to the IDLE/INACTIVE state, and the remote UE connected to the relay UE may be unable to maintain the RRC_CONNECTED state. Accordingly, when the relay UE transitions from the RRC_CONNECTED state to the RRC_IDLE/INACTIVE state, the relay UE needs to trigger the remote UE to perform relay reselection or notify the remote UE of the state transition. In this case, the relay UE may inform the remote UE of the state transition through the PC5-S link or the PC5-RRC link, notify the remote UE of the state transition through the sidelink RRC connection, or release the sidelink connection with the remote UE.

Hereinafter, detailed examples for handling the time ambiguity problem of the data inactivity timer in relay operation will be described.

When the data inactivity timer of the remote UE expires in the base station, the delay due to the relay operation increases, so ambiguity of the data inactivity timer may occur. For example, a data inactivity timer of a remote UE needs to be handled differently from a data inactivity timer not related to a relay operation, due to a delay caused by a relay operation.

In the following description, 'time period' and 'additional time period' may be preconfigured or transmitted through RRC/MAC CE signaling. The 'time interval' and the 'additional time interval' may be determined based on an increased delay due to a relay operation.

Figure 13:
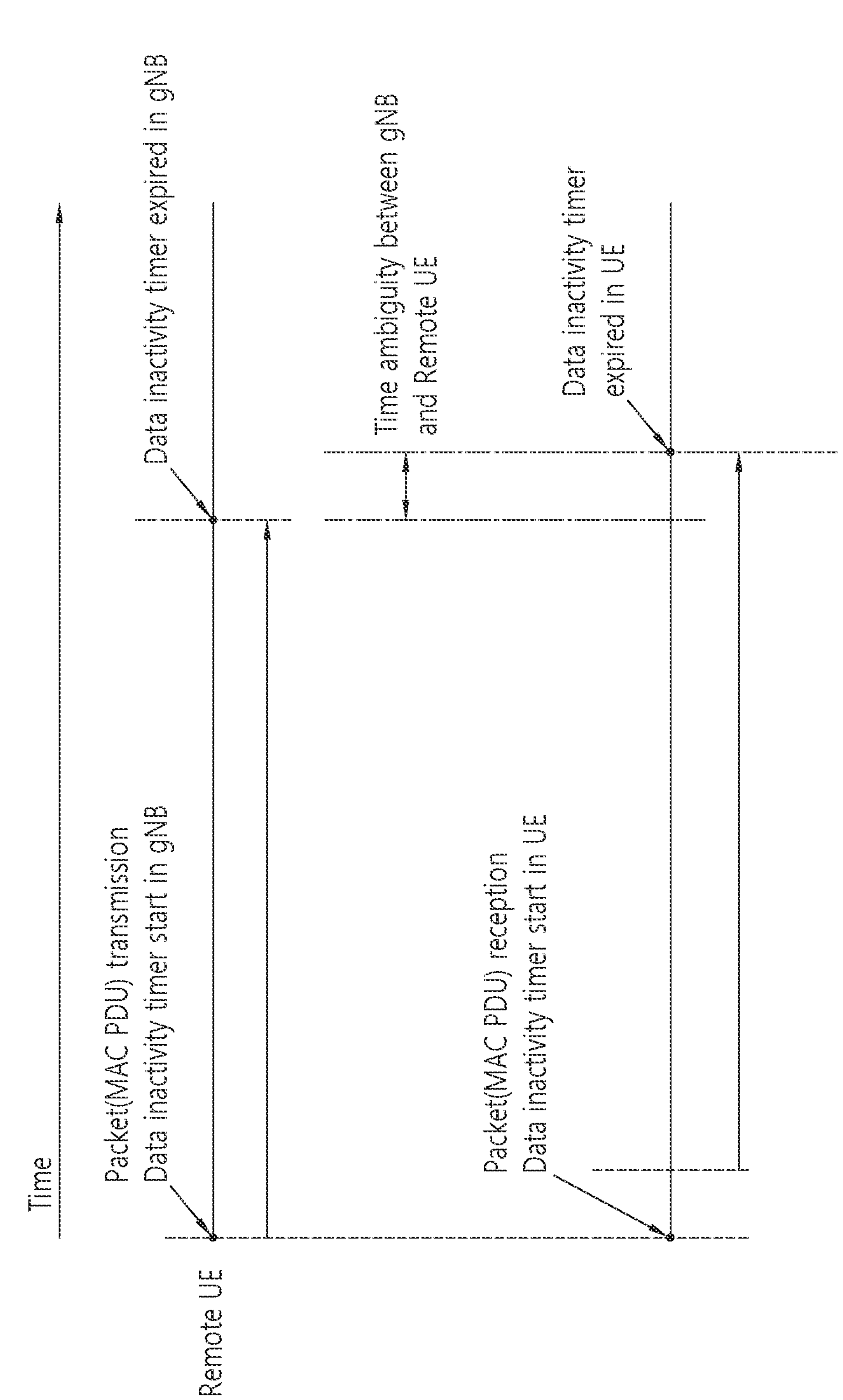
FIG. 13 shows an example of an ambiguity problem of a data inactivity timer in uplink according to an embodiment of the present disclosure.

FIG. 13 shows an example of an ambiguity problem of a data inactivity timer in uplink according to an embodiment of the present disclosure.

Referring to FIG. 13, when the remote UE transmits a MAC PDU to the base station through the relay UE, the time at which the remote UE starts the data inactivity timer and the time at which the gNB receiving the MAC PDU starts the data inactivity timer may be different from each other due to the delay time caused by the relay operation. Since the time when the remote UE starts the data inactivity timer and the time when the gNB starts the data inactivity timer are different, the time when the data inactivity timer started by the remote UE expires and the time when the data inactivity timer started by the gNB expires may be different. This may cause an ambiguity problem when the remote UE and the gNB determine the RRC state by themselves. That is, in a period in which the remote UE itself determines that it is RRC_IDLE, the gNB may still determine that the remote UE is in an RRC CONNECTED state and transmit a MAC PDU.

To solve this ambiguity problem, the following methods are proposed:

The remote UE can expect that the RRC CONNECTION with the base station is released after the expiration of the additional time period considering the delay increased due to the relay operation even after the predefined data inactivity timer expires.

When the remote UE receives data from the base station within a time interval determined in consideration of the delay increased due to the relay operation after the predefined data inactivity timer expires, the remote UE assumes the RRC_CONNECTED state and continues the operation in the RRC_CONNECTED.

The base station can assume that the connection with the remote UE is in the RRC CONNECTED state only when downlink transmission occurs before the time interval determined in consideration of the increased delay due to the relay operation before the predefined data inactivity timer expires.

Figure 14:
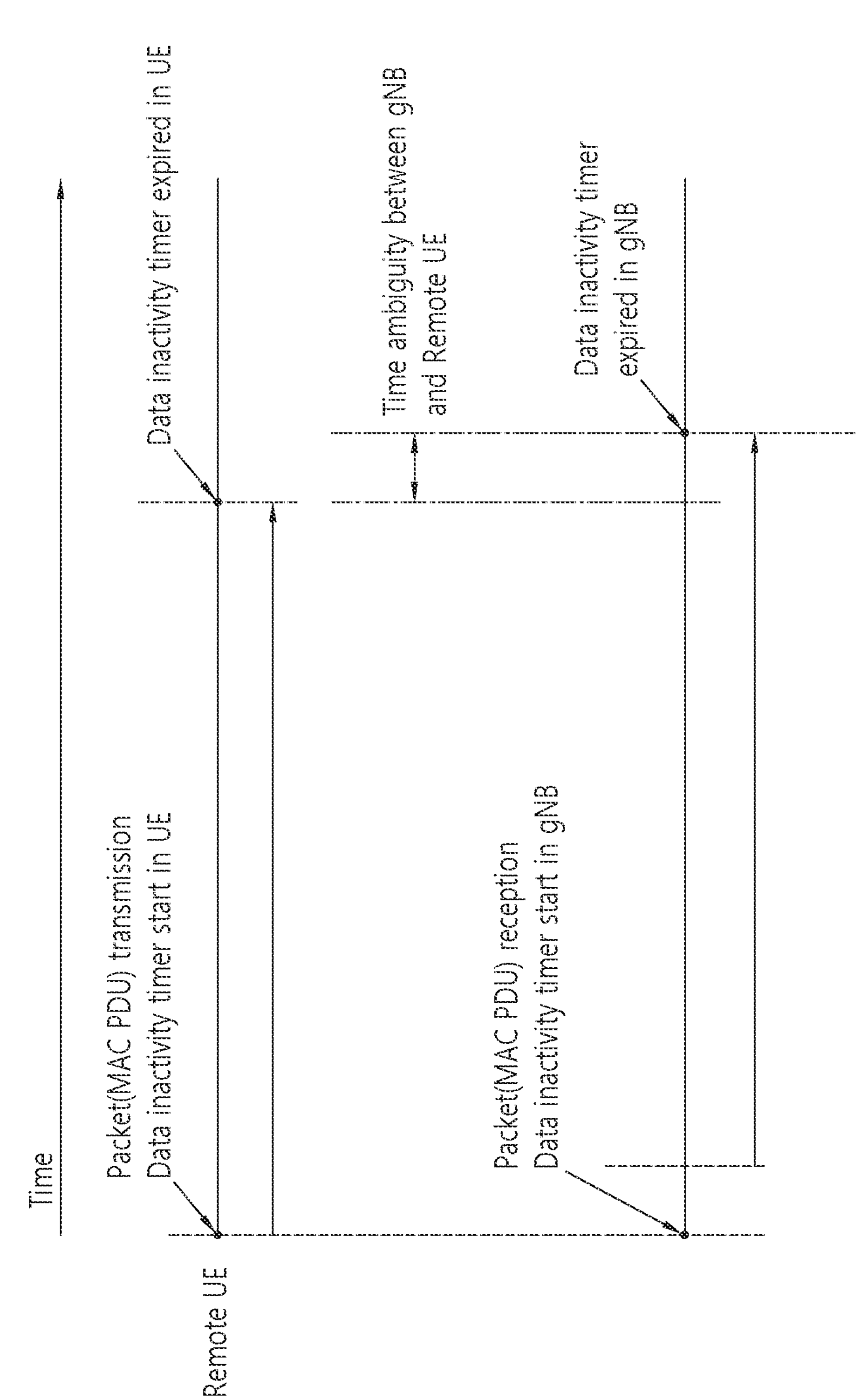
FIG. 14 shows an example of an ambiguity problem of a data inactivity timer in downlink according to an embodiment of the present disclosure.

FIG. 14 shows an example of an ambiguity problem of a data inactivity timer in downlink according to an embodiment of the present disclosure.

Referring to FIG. 14, when a base station transmits a MAC PDU to a remote UE through a relay UE, the time at which the base station starts the data inactivity timer and the time at which the remote UE receiving the MAC PDU starts the data inactivity timer may be different from each other due to the delay time caused by the relay operation. Since the time when the remote UE starts the data inactivity timer and the time when the gNB starts the data inactivity timer are different, the time when the data inactivity timer started by the remote UE expires and the time when the data inactivity timer started by the gNB expires can be different. This may cause an ambiguity problem when the remote UE and the gNB determine the RRC state by themselves. That is, the gNB may determine that the remote UE is in an RRC_CONNECTED state and transmit a MAC PDU in a period in which the remote UE determines that the remote UE is RRC_IDLE.

To solve this ambiguity problem, the following methods are proposed:

The remote UE may assume that an connection with the base station is in RRC CONNECTED state only when sidelink transmission (e.g., sidelink access transmission) occurs before the time period determined in consideration of the delay increased due to the relay operation before the predefined data inactivity timer expires.

Even after the predefined data inactivity timer expires, the base station can expect that the RRC CONNECTION with the remote UE is released after the additional time interval determined in consideration of the delay increased due to the relay operation expires.

When the base station receives data from the remote UE within a time interval determined in consideration of an increased delay due to a relay operation after a predefined data inactivity timer expires, the base station assumes an RRC_CONNECTED state and continues operation.

As described above, the method for solving the time ambiguity problem according to the RRC state transition can also be applied to the Uu link between the UE and the base station.

Meanwhile, the relay UE must not enter the IDLE/INACTIVE state unless all remote UEs connected to the relay UE are in the IDLE/INACTIVE state (that is, when any one remote UE is in the RRC_CONNECTED state). Accordingly, when starting a data inactivity timer for the remote UE, the base station may also start a data inactivity timer for a relay UE that has established a sidelink connection with the corresponding remote UE. If the data inactivity timer for the relay UE is running due to the remote UE and the data inactivity timer for the relay UE is running due to another remote UE before the timer expires, the previously running data inactivity timer may be reset and may start again. The timer operating in the base station may also operate in the relay UE. When the timer for the relay UE expires, the base station notifies the relay UE that the data inactivity timer for the relay UE has expired, thereby indicating that the state transition of the relay UE (e.g., CONNECTED→IDLE/INACTIVE) is possible.

Alternatively, the relay UE may operate a data inactivity timer for each remote UE. When the data inactivity timer corresponding to a specific remote UE expires, the relay UE may consider that the remote UE has transitioned to the IDLE/INACTIVE state and stop monitoring the corresponding remote UE.

Hereinafter, device(s) to which various embodiments of the present disclosure can be applied will be described.

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 15:
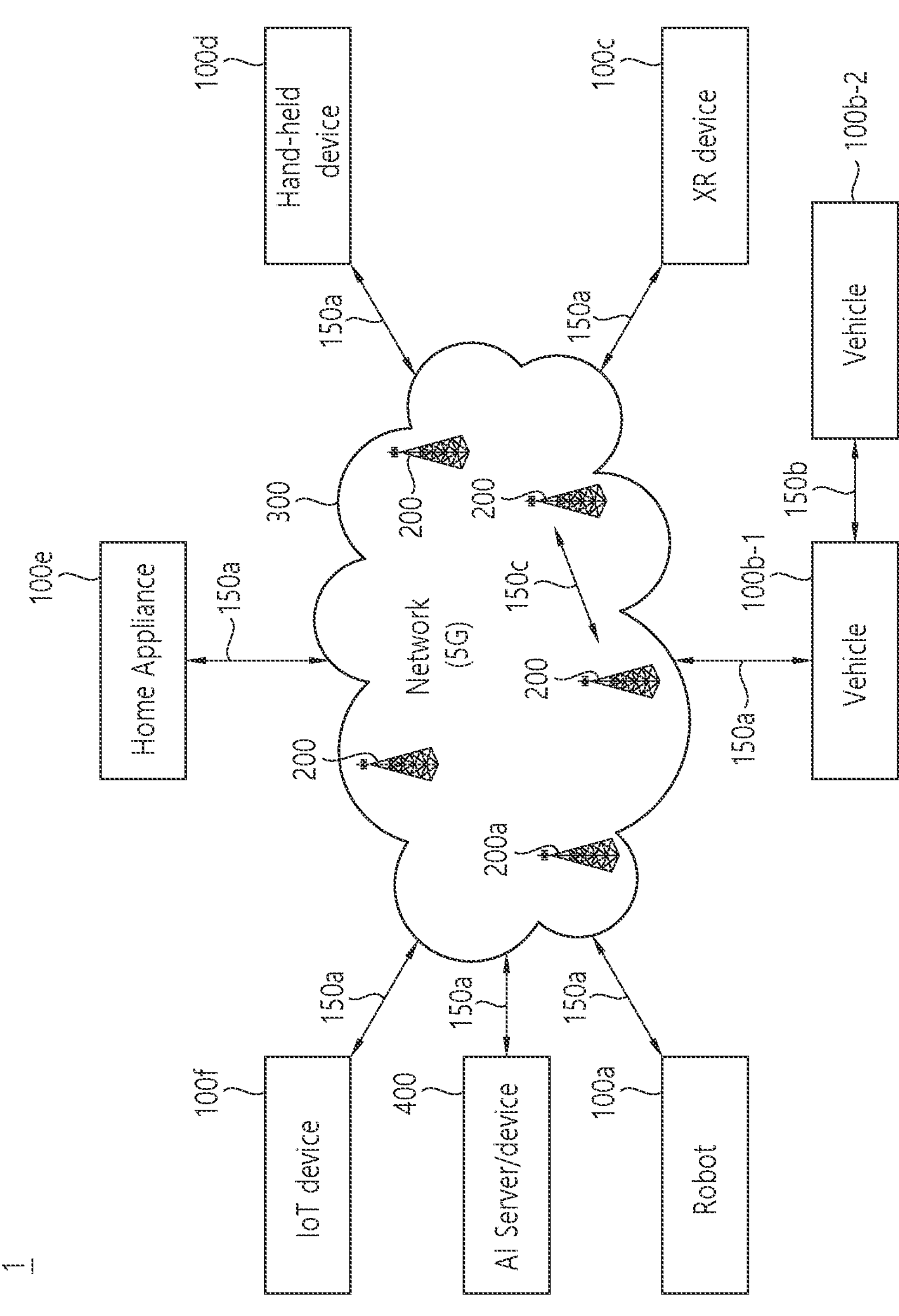
FIG. 15 shows a communication system 1, in accordance with an embodiment of the present disclosure.

FIG. 15 shows a communication system 1, in accordance with an embodiment of the present disclosure.

Referring to FIG. 15, a communication system 1 to which various embodiments of the present disclosure are applied includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100*a*, vehicles 100*b*-1 and 100*b*-2, an eXtended Reality (XR) device 100*c*, a hand-held device 100*d*, a home appliance 100*e*, an Internet of Things (IoT) device 100*f*, and an Artificial Intelligence (AI) device/server 400. For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200*a* may operate as a BS/network node with respect to other wireless devices.

The wireless devices 100*a* to 100*f* may be connected to the network 300 via the BSs 200. An AI technology may be applied to the wireless devices 100*a* to 100*f* and the wireless devices 100*a* to 100*f* may be connected to the AI server 400 via the network 300. The network 300 may be configured using a 3G network, a 4G (e.g., LTE) network, or a 5G (e.g., NR) network. Although the wireless devices 100*a* to 100*f* may communicate with each other through the BSs 200/network 300, the wireless devices 100*a* to 100*f* may perform direct communication (e.g., sidelink communication) with each other without passing through the BSs/network. For example, the vehicles 100*b*-1 and 100*b*-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100*a* to 100*f*.

Wireless communication/connections 150*a*, 150*b*, or 150*c* may be established between the wireless devices 100*a* to 100*f*/BS 200, or BS 200/BS 200. Herein, the wireless communication/connections may be established through various RATs (e.g., 5G NR) such as uplink/downlink communication 150*a*, sidelink communication 150*b* (or, D2D communication), or inter BS communication (e.g. relay, Integrated Access Backhaul (IAB)). The wireless devices and the BSs/the wireless devices may transmit/receive radio signals to/from each other through the wireless communication/connections 150*a* and 150*b*. For example, the wireless communication/connections 150*a* and 150*b* may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 16:
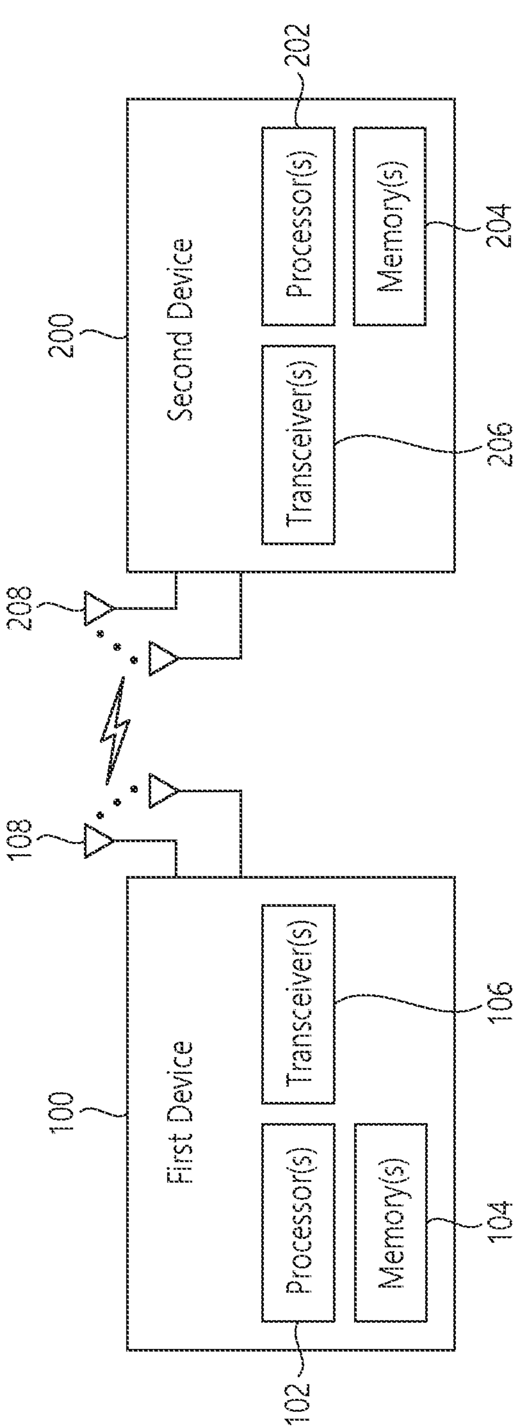
FIG. 16 shows wireless devices, in accordance with an embodiment of the present disclosure.

FIG. 16 shows wireless devices, in accordance with an embodiment of the present disclosure.

Referring to FIG. 16, a first wireless device 100 and a second wireless device 200 may transmit radio signals through a variety of RATs (e.g., LTE and NR). Herein, {the first wireless device 100 and the second wireless device 200} may correspond to {the wireless device 100*x* and the BS 200} and/or {the wireless device 100*x* and the wireless device 100*x*} of FIG. 15.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

According to various embodiments, the first wireless device 100 and/or one or more processors 102 may be configured to implement operations performed by the wireless device/UE in the present disclosure. For example, one or more processors 102 may be configured to monitor a paging for a second UE in a first state. The first state may comprise at least one of an idle state or an inactive state. The one or more processors 102 may be configured to obtain state information indicating that a state of the second UE has changed from the first state to a second state. The second state may comprise a connected state. Based on obtaining the state information, the one or more processors 102 may be configured to stop the monitoring of the paging for the second UE in the second state.

According to various embodiments, the second wireless device 200 and/or one or more processors 202 may be configured to implement operations performed by a base station (e.g., a mobility source/target base station) in the present disclosure. For example, one or more processors 202 may be configured to control one or more transceivers 206 to receive, from a first user equipment (UE) in an inactive state, a request message for a state change request of a second UE in a first state. The first state may comprise at least one of an idle state or the inactive state. Based on receiving the request message, the one or more processors 202 may be configured to determine that the first UE has transitioned from the inactive state to a connected state. The one or more processors 202 may be configured to control one or more transceivers 206 to transmit, to the first UE, a response message for an acknowledgement of the status change request of the second UE. After transmitting the response message, the one or more processors 202 may be configured to determine a state change of the second UE that the state of the second UE has changed from the first state to a second state. The second state may comprise the connected state. The one or more processors 202 may be configured to stop a transmission of a paging for the second UE based on the status change of the second UE.

Figure 17:
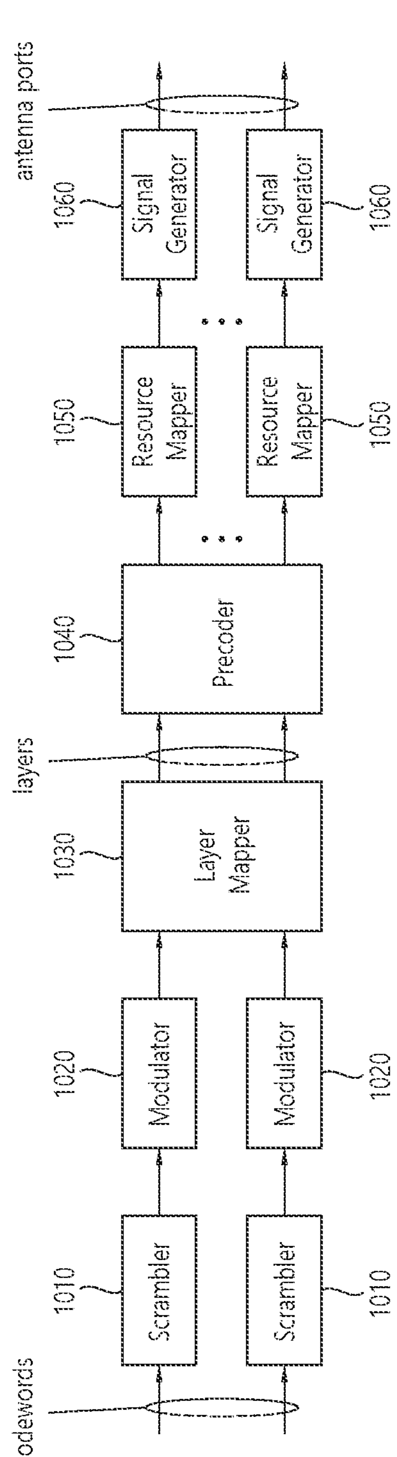
FIG. 17 shows a signal process circuit for a transmission signal, in accordance with an embodiment of the present disclosure.

FIG. 17 shows a signal process circuit for a transmission signal, in accordance with an embodiment of the present disclosure.

Referring to FIG. 17, a signal processing circuit 1000 may include scramblers 1010, modulators 1020, a layer mapper 1030, a precoder 1040, resource mappers 1050, and signal generators 1060. An operation/function of FIG. 17 may be performed, without being limited to, the processors 102 and 202 and/or the transceivers 106 and 206 of FIG. 16. Hardware elements of FIG. 17 may be implemented by the processors 102 and 202 and/or the transceivers 106 and 206 of FIG. 16. For example, blocks 1010 to 1060 may be implemented by the processors 102 and 202 of FIG. 16. Alternatively, the blocks 1010 to 1050 may be implemented by the processors 102 and 202 of FIG. 16 and the block 1060 may be implemented by the transceivers 106 and 206 of FIG. 16.

Codewords may be converted into radio signals via the signal processing circuit 1000 of FIG. 17. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 17. For example, the wireless devices (e.g., 100 and 200 of FIG. 16)

may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Figure 18:
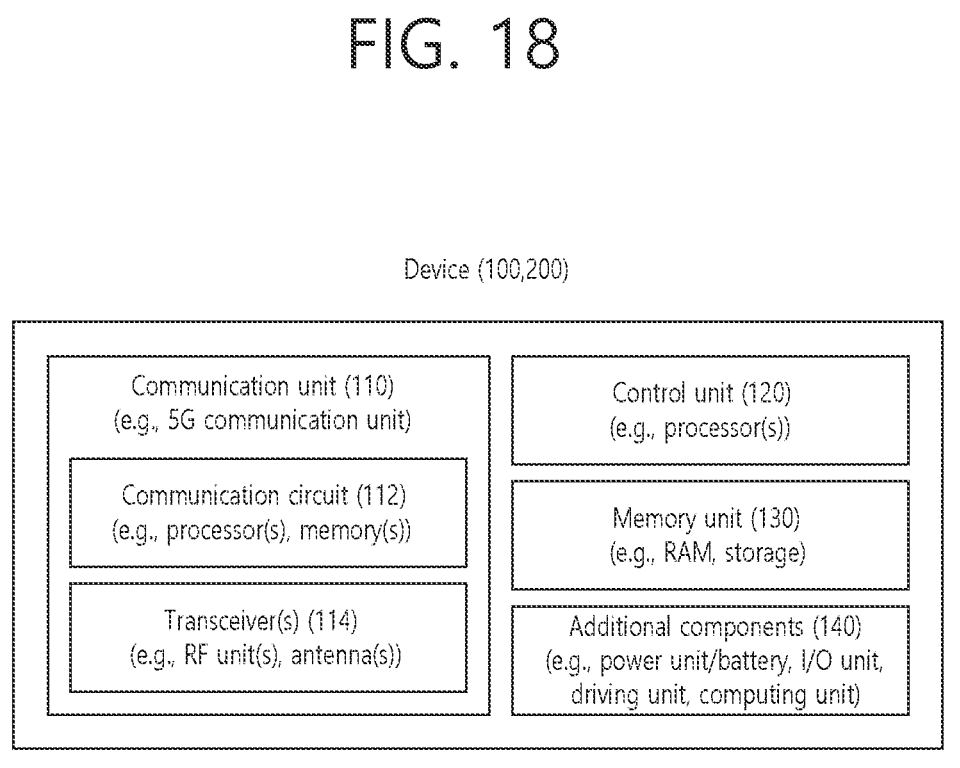

FIG. 18 shows another example of a wireless device, in accordance with an embodiment of the present disclosure. The wireless device may be implemented in various forms according to a use-case/service (refer to FIG. 15).

Referring to FIG. 18, wireless devices 100 and 200 may correspond to the wireless devices 100 and 200 of FIG. 16 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 16. For example, the transceiver(s) 114 may include the one or more transceivers 106 and 206 and/or the one or more antennas 108 and 208 of FIG. 16. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100*a* of FIG. 15), the vehicles (100*b*-1 and 100*b*-2 of FIG. 15), the XR device (100*c* of FIG. 15), the hand-held device (100*d* of FIG. 15), the home appliance (100*e* of FIG. 15), the IoT device (100*f* of FIG. 15), a digital broadcast UE, a hologram device, a public safety device, an MTC device, a medicine device, a fintech device (or a finance device), a security device, a climate/environment device, the AI server/device (400 of FIG. 15), the BSs (200 of FIG. 15), a network node, etc. The wireless device may be used in a mobile or fixed place according to a use-example/service.

In FIG. 18, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 18 will be described in detail with reference to the drawings.

Figure 19:
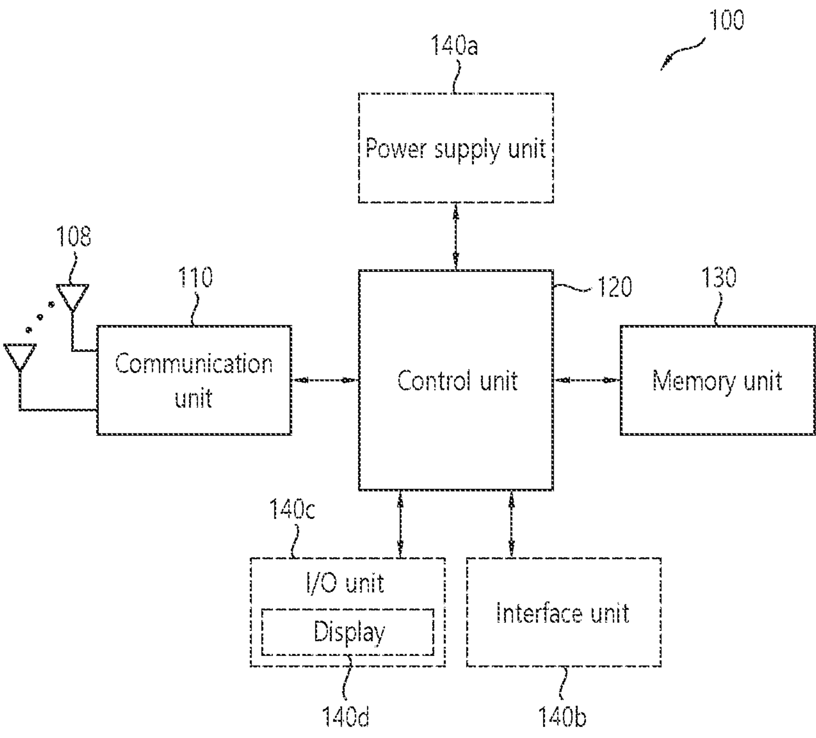
FIG. 19 shows a hand-held device, in accordance with an embodiment of the present disclosure.

FIG. 19 shows a hand-held device, in accordance with an embodiment of the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user UE (UT), a Mobile Subscriber Station (MSS), a Subscriber Station (SS), an Advanced Mobile Station (AMS), or a Wireless UE (WT).

Referring to FIG. 19, a hand-held device 100 may include an antenna unit 108, a communication unit 110, a control unit 120, a memory unit 130, a power supply unit 140*a*, an interface unit 140*b*, and an I/O unit 140*c*. The antenna unit 108 may be configured as a part of the communication unit 110. Blocks 110 to 130/140*a* to 140*c* correspond to the blocks 110 to 130/140 of FIG. 18, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140*a* may supply power to the hand-held device 100 and include a wired/wireless charging circuit, a battery, etc. The interface unit 140*b* may support connection of the hand-held device 100 to other external devices. The interface unit 140*b* may include various ports (e.g., an audio I/O port and a video I/O port) for connection with external devices. The I/O unit 140*c* may input or output video information/signals, audio information/signals, data, and/or information input by a user. The I/O unit 140*c* may include a camera, a microphone, a user input unit, a display unit 140*d*, a speaker, and/or a haptic module.

As an example, in the case of data communication, the I/O unit 140*c* may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140*c*.

Figure 20:
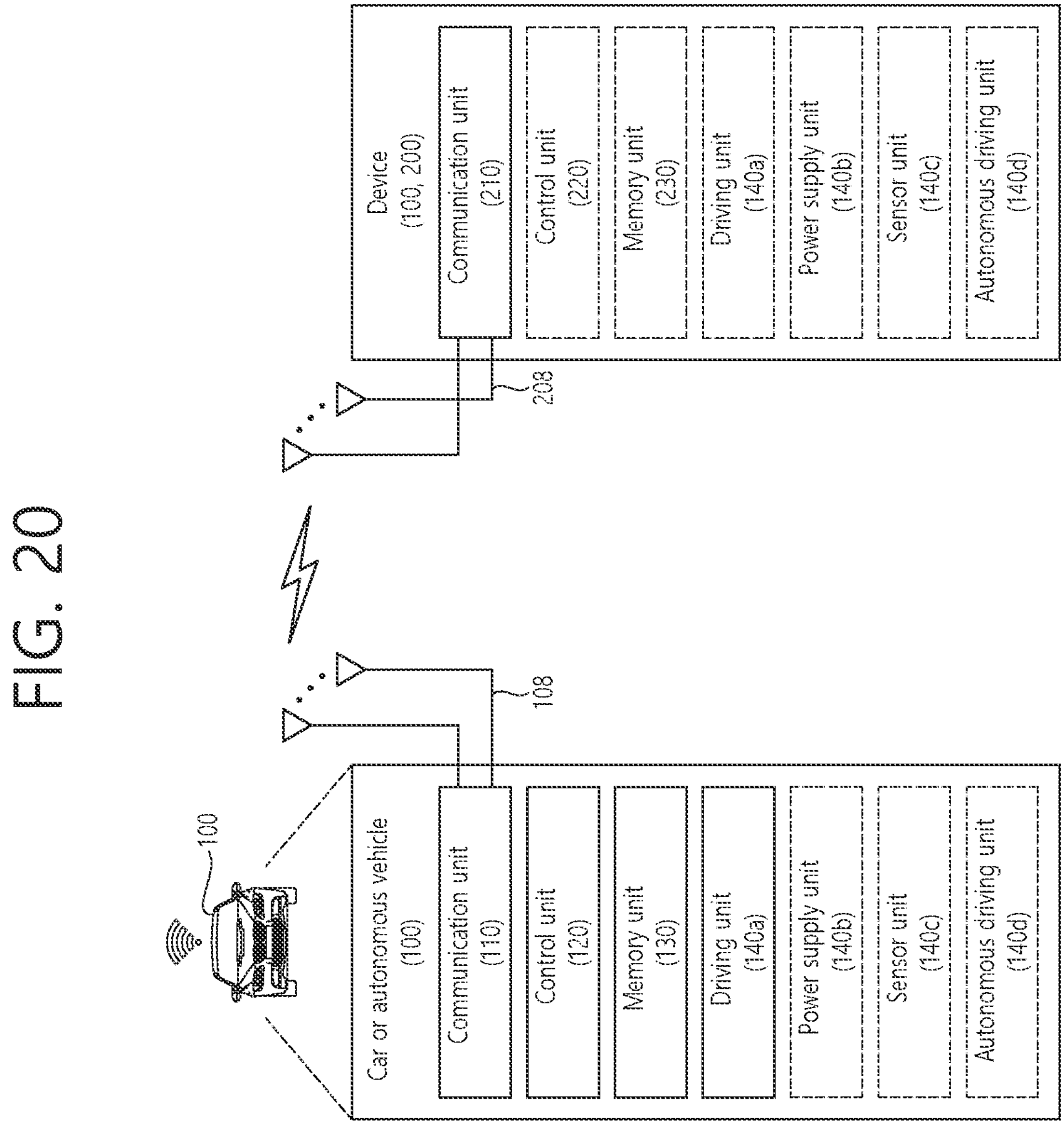
FIG. 20 shows a vehicle or an autonomous vehicle, in accordance with an embodiment of the present disclosure.

FIG. 20 shows a vehicle or an autonomous vehicle, in accordance with an embodiment of the present disclosure. The vehicle or autonomous vehicle may be implemented by a mobile robot, a car, a train, a manned/unmanned Aerial Vehicle (AV), a ship, etc.

Referring to FIG. 20, a vehicle or autonomous vehicle 100 may include an antenna unit 108, a communication unit 110, a control unit 120, a driving unit 140*a*, a power supply unit 140*b*, a sensor unit 140*c*, and an autonomous driving unit 140*d*. The antenna unit 108 may be configured as a part of the communication unit 110. The blocks 110/130/140*a* to 140*d* correspond to the blocks 110/130/140 of FIG. 18, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous vehicle 100. The control unit 120 may include an Electronic Control Unit (ECU). The driving unit 140*a* may cause the vehicle or the autonomous vehicle 100 to drive on a road. The driving unit 140*a* may include an engine, a motor, a powertrain, a wheel, a brake, a steering device, etc. The power supply unit 140*b* may supply power to the vehicle or the autonomous vehicle 100 and include a wired/wireless charging circuit, a battery, etc. The sensor unit 140*c* may acquire a vehicle state, ambient environment information, user information, etc. The sensor unit 140*c* may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140*d* may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140*d* may generate an autonomous driving path and a driving plan from the obtained data. The control unit 120 may control the driving unit 140*a* such that the vehicle or the autonomous vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140*c* may obtain a vehicle state and/or surrounding environment information. The autonomous driving unit 140*d* may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous vehicles and provide the predicted traffic information data to the vehicles or the autonomous vehicles.

The present disclosure may have various effects.

For example, unnecessary operation that may occur due to incorrect assumption of the RRC state of the remote UE can be prevented by the relay UE obtaining information for the state transition of the remote UE.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. A method comprising:

establishing, by a relay user equipment (UE), a connection with a remote UE;

monitoring, by the relay UE in a radio resource control (RRC) idle state or RRC inactive state, a paging occasion of the remote UE in the RRC idle state or RRC inactive state;

entering, by the relay UE, an RRC connected state based on receiving a first message from the remote UE, wherein the first message is an RRC setup request message; and stopping, by the relay UE, monitoring a paging occasion of the remote UE based on receiving a second message from the remote UE, wherein the second message comprises information that is set based on the remote UE entering the RRC connected state.

2. The method of claim 1, wherein a destination of the first message is set to a base station.

3. The method of claim 1, wherein the second message comprises an indication information indicating that the remote UE has transmitted the RRC setup request message to a base station.

4. The method of claim 1, further comprising:

receiving a PC5-RRC message comprising the first message and indication information indicating that the first message is the RRC setup request message from the remote UE; and identifying that the first message is the RRC setup request message, by decoding the indication information without decoding the first message in the PC5-RRC message.

5. The method of claim 4, wherein the indication information is included in a header of the PC5-RRC message.

6. The method of claim 1, wherein the relay UE and the remote UE are autonomous vehicles that perform vehicle-to-everything (V2X) communication with each other.

7. A relay user equipment (UE) comprising:

a transceiver;

a memory; and at least one processor operatively coupled to the transceiver and the memory, wherein the memory stores instructions that, based on being executed by the at least one processor, perform operations comprising:

establishing a connection with a remote UE;

monitoring, in a radio resource control (RRC) idle state or RRC inactive state, a paging occasion of the remote UE in the RRC idle state or RRC inactive state;

entering an RRC connected state based on receiving a first message from the remote UE, wherein the first message is an RRC setup request message; and stopping monitoring a paging occasion of the remote UE based on receiving a second message from the remote UE, wherein the second message comprises information that is set based on the remote UE entering the RRC connected state.

* * * * *